United States Patent
Eguchi et al.

(10) Patent No.: US 9,606,738 B2
(45) Date of Patent: Mar. 28, 2017

(54) MEMORY SYSTEM WITH A BRIDGE PART PROVIDED BETWEEN A MEMORY AND A CONTROLLER

(71) Applicant: KABUSHIKI KAISHA TOSHIBA, Minato-ku (JP)

(72) Inventors: Yasuyuki Eguchi, Kawasaki (JP); Jin Kashiwagi, Machida (JP); Hideaki Yamazaki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 28 days.

(21) Appl. No.: 14/482,690

(22) Filed: Sep. 10, 2014

(65) Prior Publication Data

US 2015/0254009 A1    Sep. 10, 2015

Related U.S. Application Data

(60) Provisional application No. 61/950,567, filed on Mar. 10, 2014.

(51) Int. Cl.
| | | |
|---|---|---|
| *G06F 12/00* | (2006.01) | |
| *G06F 13/00* | (2006.01) | |
| *G06F 3/06* | (2006.01) | |

(52) U.S. Cl.
CPC .......... *G06F 3/0619* (2013.01); *G06F 3/0634* (2013.01); *G06F 3/0688* (2013.01)

(58) Field of Classification Search
None
See application file for complete search history.

(56) References Cited

U.S. PATENT DOCUMENTS

| | | | |
|---|---|---|---|
| 6,219,724 B1* | 4/2001 | Kim ....................... | G06F 13/28 710/22 |
| 6,247,086 B1* | 6/2001 | Allingham .......... | G06F 13/4059 710/314 |
| 6,405,276 B1* | 6/2002 | Chen ................... | G06F 13/4059 710/109 |
| 2004/0148541 A1* | 7/2004 | Riley .................. | G06F 13/4022 713/503 |
| 2005/0062678 A1* | 3/2005 | Mark ...................... | G06T 15/00 345/2.1 |
| 2006/0280018 A1* | 12/2006 | Cases .................. | G06F 13/4072 365/226 |
| 2007/0143521 A1* | 6/2007 | Raju ....................... | G06F 13/28 710/310 |
| 2009/0164686 A1* | 6/2009 | Sprouse ................ | G06F 13/385 710/302 |
| 2009/0313408 A1* | 12/2009 | Yanagawa ........... | G06F 13/4031 710/105 |
| 2011/0055432 A1* | 3/2011 | Morrow ................ | G06F 13/102 710/9 |
| 2012/0204079 A1 | 8/2012 | Takefman et al. | |
| 2014/0192583 A1* | 7/2014 | Rajan ...................... | G11C 7/10 365/63 |

\* cited by examiner

*Primary Examiner* — Sean D Rossiter
(74) *Attorney, Agent, or Firm* — Oblon, McClelland, Maier & Neustadt, L.L.P.

(57) ABSTRACT

A memory system according to the present embodiment includes a memory controller including a first data bus and a first address bus. A memory part includes a second data bus and a second address bus. A bridge part is capable of receiving an address from the memory controller via the first data bus, and outputs the address via the first address bus to the memory part.

16 Claims, 29 Drawing Sheets

| DRIVER COMMAND (NAND COMMAND) | BANK ADDRESS | DRAM COMMAND | FUNCTION |
|---|---|---|---|
| Write Read Add Q | BA0 | Write | REGISTER READ ADDRESS IN Q |
| Read Status | BA1 | Read | READ STATUS |
| Write Read Add | BA2 | Write | TRANSMIT READ ADDRESS |
| Read Data | | Read | READ DATA |
| Write Write Add | BA4 | Write | TRANSMIT WRITE ADDRESS |
| Write Data | BA5 | Write | TRANSMIT WRITE DATA |

FIG. 3

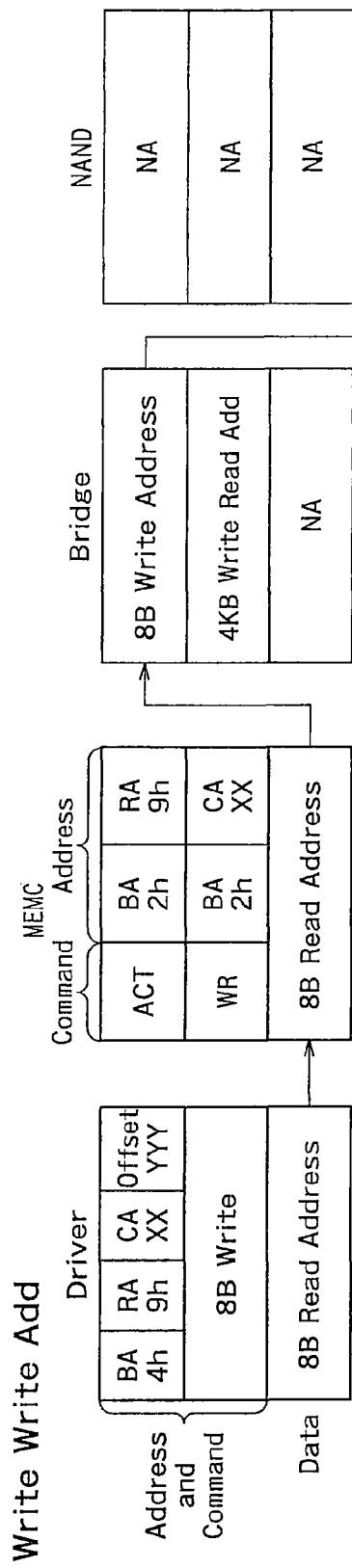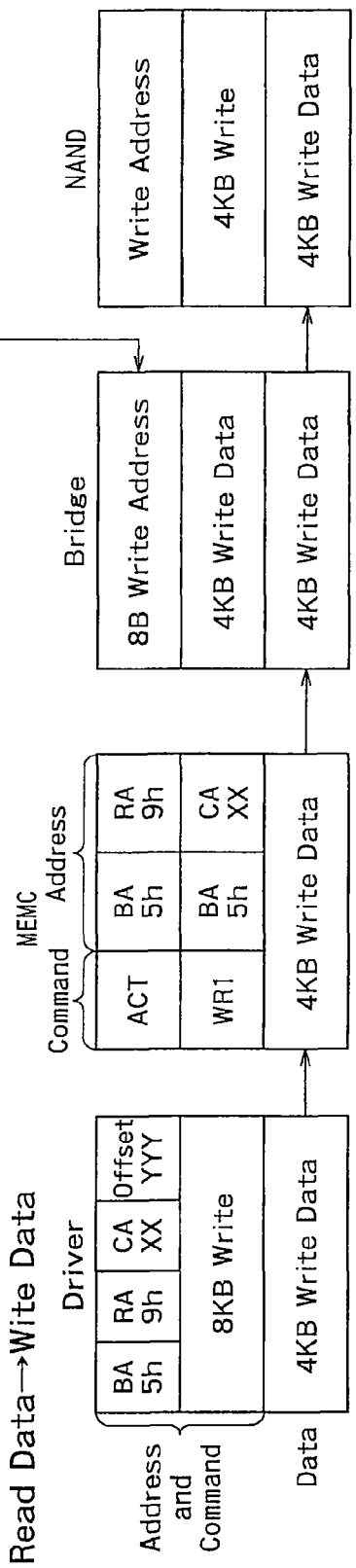

| ORDER OF PROCESSES | INTERRUPT IS PROHIBITED | INTERRUPT IS PERMITTED |
|---|---|---|
| 1 | WRITE REQUEST (PRIORITY LOW) | READ REQUEST 1 (PRIORITY HIGH) |
| 2 | WRITE REQUEST 2 (PRIORITY LOW) | WRITE REQUEST 1 (PRIORITY LOW) |
| 3 | WRITE REQUEST 3 (PRIORITY LOW) | WRITE REQUEST 2 (PRIORITY LOW) |
| 4 | READ REQUEST 1 (PRIORITY HIGH) | WRITE REQUEST 3 (PRIORITY LOW) |

FIG. 15

| RA[16:6] | RA[5:0] | BURST LENGTH |
|---|---|---|
| 000h | 00h | 8B ($2^0$*8B) |
| | 01h | 16B ($2^1$*8B) |
| | 02h | 32B ($2^2$*8B) |
| | 03h | 64B ($2^3$*8B) |
| | 04h | 128B ($2^4$*8B) |
| | ... | ... |
| | 07h | 1KB ($2^7$*8B) |
| | 08h | 2KB ($2^8$*8B) |
| | 09h | 4KB ($2^9$*8B) |
| | ... | ... |
| | 11h | 1MB ($2^{17}$*8B) |
| | 12h | 2MB ($2^{18}$*8B) |
| | 13h | 4MB ($2^{19}$*8B) |
| | ... | ... |
| | 1Bh | 1GB ($2^{27}$*8B) |
| | 1Ch | 2GB ($2^{28}$*8B) |
| | 1Eh | 4GB ($2^{29}$*8B) |
| | ... | ... |
| | 25h | 1TB ($2^{37}$*8B) |
| | 26h | 2TB ($2^{38}$*8B) |
| | 27h | 4TB ($2^{39}$*8B) |
| | ... | ... |

FIG. 16

| NAME OF REGISTER | CODE | DESCRIPTION |
|---|---|---|
| STREG[0] | Ready | INDICATING WHETHER READ DATA IS PREPARED (1: ready, 0: not ready) |
| STREG[1] | WB | INDICATING WHETHER THERE IS A SPACE IN A WRITE BUFFER (1: ready, 0: not ready) |
| STREG[9:2] | Etime | APPROXIMATE TIME DURING WHICH READ DATA IS STORED FROM NAND MEMORY IN A BUFFER OF BRIDGE CHIP (OR THE NUMBER OF DATA WRITE PROCESSES AND DATA ERASURE PROCESSES PERFORMED BEFORE A READ OPERATION STARTS) |
| STREG[17:10] | RD_REQ | THE NUMBER OF RD_REQ_Q (1-256) |
| STREG[25:18] | RD_COM | THE NUMBER OF RD_COM_Q (1-256) |
| STREG[33:26] | WR_REQ | THE NUMBER OF WR_REQ_Q (1-256) |
| STREG[39:34] | EMP_RB | FREE SPACE IN READ BUFFER |
| STREG[45:40] | OCU_RB | USAGE OF WRITE BUFFER |
| STREG[51:46] | EMP_WB | FREE SPACE IN WRITE BUFFER |
| STREG[57:52] | OCU_WB | USAGE OF WRITE BUFFER |
| STREG[118:58] | RD_CMP_1 | FIRST ADDRESS OF RD_CMP_Q AND BURST LENGTH OF FIRST ADDRESS |
| STREG[179:119] | RD_CMP_2 | SECOND ADDRESS OF RD_CMP_Q AND BURST LENGTH OF SECOND ADDRESS |
| STREG[240:180] | RD_CMP_3 | THIRD ADDRESS OF RD_CMP_Q AND BURST LENGTH OF THIRD ADDRESS |
| STREG[301:241] | RD_CMP_4 | FOURTH ADDRESS OF RD_CMP_Q AND BURST LENGTH OF FOURTH ADDRESS |
| STREG[362:302] | RD_CMP_5 | FIFTH ADDRESS OF RD_CMP_Q AND BURST LENGTH OF FIFTH ADDRESS |
| STREG[423:363] | RD_CMP_6 | SIXTH ADDRESS OF RD_CMP_Q AND BURST LENGTH OF SIXTH ADDRESS |
| STREG[484:424] | RD_CMP_7 | SEVENTH ADDRESS OF RD_CMP_Q AND BURST LENGTH OF SEVENTH ADDRESS |
| STREG[511:485] | Reserve | UNUSED |

FIG. 17

| DRIVER COMMAND (NAND COMMAND) | BANK ADDRESS | DRAM COMMAND | FUNCTION |
|---|---|---|---|
| Read Status | BA0 | READ | REGISTER READ ADDRESS IN Q |
| Read Status | BA1 | READ | READ STATUS |
| Read Data | BA2 | READ | READ DATA |
| Write Data | BA3 | WRITE | WRITE DATA |

FIG. 19

|  | MRAM | DRAM |
|---|---|---|
| Row Address | A[0]-A[n] | A[0]-A[n-1] |
| Column Address | A[0]-A[m] | A[0]-A[m+1] |
FIG. 25
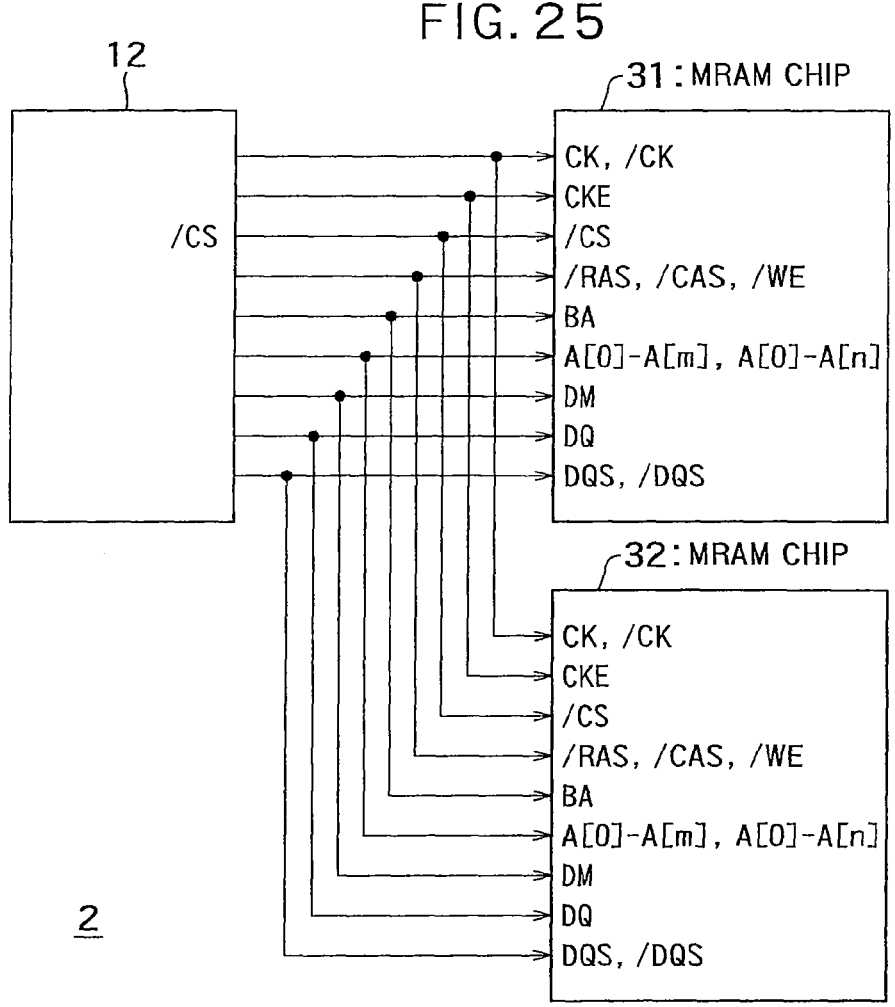
FIG. 26
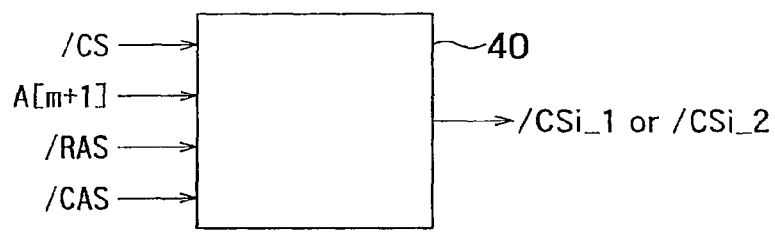
FIG. 27

| /CS | /RAS | /CAS | A[m+1] | /CSi_1 | /CSi_2 |
|---|---|---|---|---|---|
| H | X | X | X | H | H |
| L | L | L | X | L | L |
| L | L | H | X | L | L |
| L | H | L | L | L | L |
| L | H | L | H | H | L |
| L | H | H | X | H | H |

FIG. 28

| /CS | /RAS | /CAS | BA[2] | /CSi_1 | /CSi_2 |
|-----|------|------|-------|--------|--------|
| H   | X    | X    | X     | H      | H      |
| L   | L    | L    | X     | L      | L      |
| L   | L    | H    | L     | L      | H      |
| L   | H    | L    | H     | H      | L      |
| L   | H    | H    | L     | L      | H      |
| L   | H    | H    | H     | H      | L      |
| L   | H    | H    | X     | H      | H      |

|  | MRAM | DRAM |
|---|---|---|
| Density (Gbit) | A | 2 * A |
| CS | 1 | 1 |
| Row Address | A[0]-A[n] | A[0]-A[n-1] |
| Column Address | A[0]-A[m] | A[0]-A[m+2] |

FIG. 34

| /CS0 | /CS1 | /CSi_1 | /CSi_2 | /CSi_3 | /CSi_4 | A[n] |
|---|---|---|---|---|---|---|
| L | L | PROHIBITED | | | | PROHIBITED |
| H | L | L | | | | L |
| L | H | L | | | | H |
| H | H | H | | | | X |

FIG. 35

| A[m+1] | A[m+2] | /CS0 | /CS1 | /CSi_1 | /CSi_2 | /CSi_3 | /CSi_4 |
|---|---|---|---|---|---|---|---|
| L | L | L | L | PROHIBITED | PROHIBITED | PROHIBITED | PROHIBITED |
| H | L | L | L | PROHIBITED | PROHIBITED | PROHIBITED | PROHIBITED |
| L | H | L | L | PROHIBITED | PROHIBITED | PROHIBITED | PROHIBITED |
| H | H | L | L | PROHIBITED | PROHIBITED | PROHIBITED | PROHIBITED |
| L | L | H | L | L | H | H | H |
| H | L | H | L | H | L | H | H |
| L | H | H | L | H | H | L | H |
| H | H | H | L | H | H | H | L |
| L | L | L | H | L | H | H | H |
| H | L | L | H | H | L | H | H |
| L | H | L | H | H | H | L | H |
| H | H | L | H | H | H | H | L |
| L | L | H | H | H | H | H | H |
| H | L | H | H | H | H | H | H |
| L | H | H | H | H | H | H | H |
| H | H | H | H | H | H | H | H |

Rows with /CS0=H, /CS1=L and /CS0=L, /CS1=H are ACTIVE.

FIG. 36

MEMORY SYSTEM WITH A BRIDGE PART PROVIDED BETWEEN A MEMORY AND A CONTROLLER

CROSS REFERENCE TO RELATED APPLICATIONS

This application is based upon and claims the benefit of priority from the prior US provisional Patent Application No. 61/950,567, filed on Mar. 10, 2014, the entire contents of which are incorporated herein by reference.

FIELD

The embodiments of the present invention relate to a memory system.

BACKGROUND

As large-capacity memory, DRAM (Dynamic Random Access Memory), NAND-type flash memory and MRAM (Magnetoresistive Random Access Memory) has been widely known.

BRIEF DESCRIPTION OF THE DRAWINGS

FIG. 3 is a command truth table in the bridge chip 21;

FIGS. 4 to 9 show examples of a configuration of an address, a command, and data from the driver 10 to the NAND memory 22;

FIG. 15 is a table representing a priority and an interrupt of a read request and a write request;

FIG. 16 is a table representing a relationship between a row address RA and a burst length;

FIG. 17 is a table of an example of a status register that stores therein status information;

FIG. 19 is a command truth table in the bridge chip 21;

FIG. 25 is a table representing a relationship of the number of addresses of a MRAM and a DRAM according to a third embodiment;

FIG. 26 is a block diagram of an example of a configuration of the memory system 2 according to the third embodiment;

FIG. 27 is a block diagram of an example of a configuration of an activation-signal control unit 40 that performs a logical operation of the chip select signal /CS, the column address A[m+1], and the signals /RAS and /CAS;

FIG. 28 is a truth table representing a logical operation of the activation-signal control unit 40;

FIG. 34 is a table representing a relationship of the number of addresses of a MRAM and a DRAM according to the fifth embodiment;

FIG. 35 is a truth table representing a logical operation of a chip select signal in an active command; and FIG. 36 is a truth table representing a logical operation of a chip select signal at the time of read or write.

DETAILED DESCRIPTION

Embodiments will now be explained with reference to the accompanying drawings. The present invention is not limited to the embodiments.

A memory system according to the present embodiment comprises a memory controller including a first data bus and a first address bus. A memory part includes a second data bus and a second address bus. A bridge part is capable of receiving an address from the memory controller via the first data bus, and outputs the address via the first address bus to the memory part.

Components with substantially the same functionalities and configurations will be referred to with the same reference number and duplicate descriptions will be made only when required. Note that figures are schematic and the relationship between the thickness and the plane dimension of a film and the ratios of the thickness of one layer to another may differ from actual values. Therefore, it should be noted that a specific thickness and dimension should be determined in accordance with the following description. Moreover, it is natural that different figures may contain a component different in dimension and/or ratio.

When a NAND memory is connected to a DRAM bus, there are the following problems.

1. An address bus of a DRAM bus covers gigabits order density, and is not applicable to an address bus of a NAND memory to have terabits or more density. For example, an address bus of a DDR4 SDRAM will only support up to 16 gigabits. That is, because the transmission capacity of an address bus of a NAND memory is larger than that of an address bus of a DRAM bus, a DRAM controller cannot access all addresses of the NAND memory.

2. In a DRAM controller, at the time of read or write, data can be output or input after a predetermined latency (for example, 50 ns). On the other hand, the latency of a NAND memory is longer than that of the DRAM and has a variable access time (for example, approximately 50 μs). Therefore, the DRAM controller cannot control the NAND memory directly.

3. A DRAM controller can issue a read command or a write command to memory areas (banks) having different bank addresses in parallel. However, the number of commands that can be issued simultaneously is limited to the number of banks, and commands more than the number of banks cannot be issued simultaneously. For example, the number of banks is set to 16 in a DDR4 SDRAM. Therefore, in this case, the DRAM controller can issue only 16 commands in parallel.

As explained above, when a DRAM controller is directly connected to a NAND memory, a plurality of problems occur. In the present embodiment, a bridge chip 21 is provided between a DRAM controller (a driver 10) and a NAND memory 22, so that an address, a command, and data can be received and outputted between the DRAM driver 10 and the NAND memory 22. A first embodiment is explained below in detail.

(First Embodiment)

Figure 1:
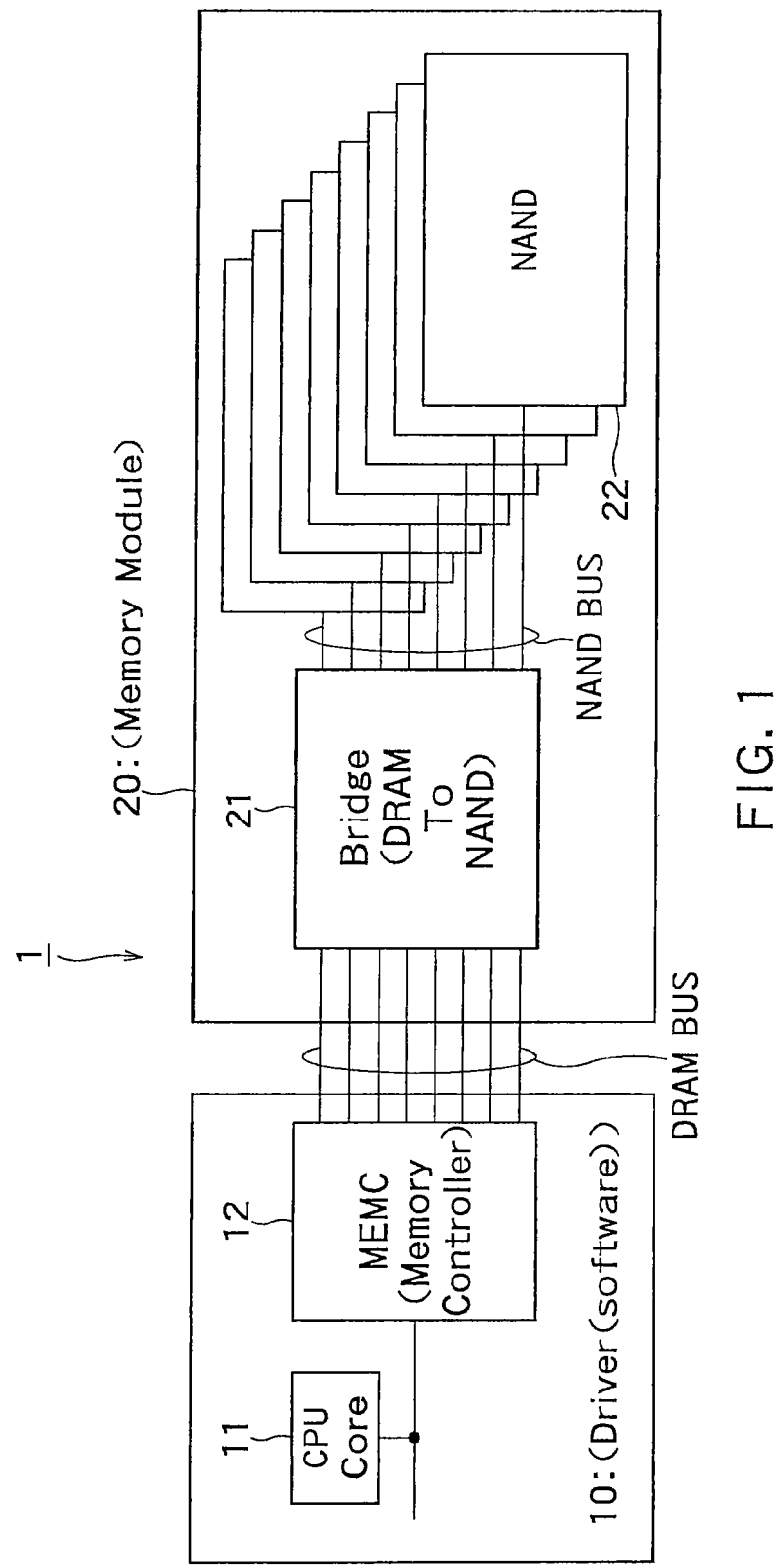
FIG. 1 is a block diagram of an example of a configuration of a memory system 1 according to the first embodiment.

FIG. 1 is a block diagram of an example of a configuration of a memory system 1 according to the first embodiment. The memory system 1 includes the driver 10 and a memory module 20. For example, the driver 10 is software that is executable on one CPU and is also a driver for operating a DRAM module.

Meanwhile, the memory module 20 includes the bridge chip 21 and the NAND memory 22. The bridge chip 21 is connected between a DRAM bus and a NAND bus of the NAND memory 22, and can convert protocols of an address, a command, and a data signal between the driver 10 and the NAND memory 22. The NAND memory 22 includes a plurality of memory chips each of which includes a NAND flash memory.

Figure 2:
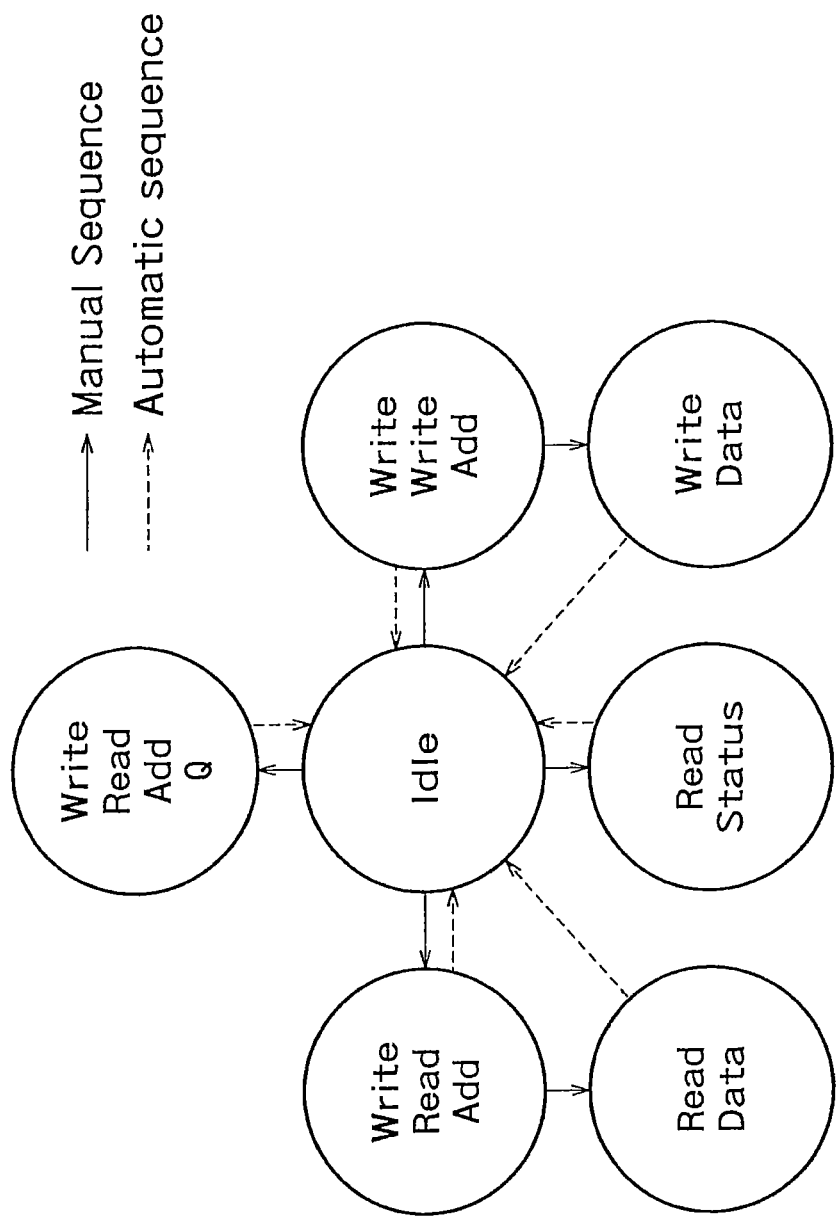
FIG. 2 is a state diagram of the driver 10.

FIG. 2 is a state diagram of the driver 10. FIG. 3 is a command truth table in the bridge chip 21. FIG. 2 shows a transition from an idle state to each state. A solid line denotes a transition by a command and a broken line denotes an automatic return to an idle state after a command is executed.

With reference to FIG. 3, a DRAM command output from the driver 10 indicates write or read of data in or from a bank specified by a bank address. Meanwhile, an address and a command (a NAND command) converted via the bridge chip 21 have a different meaning from that of the DRAM command. For example, when a DRAM command indicates "write" of data in a bank address "BA0", the bridge chip 21 converts this DRAM command into a NAND command meaning that "register read address in Q(RD_REQ_Q) (Write Read Add Q)". Q(RD_REQ_Q) is a memory area in the bridge chip 21 that accumulates a read request. Therefore, data transmitted via a data bus of a DRAM bus is not simple write data but a read address. That is, while data is only written in the bank BA0 as viewed from the driver 10, in practice, this data is stored in the bridge chip 21 as a read address. At this time, while the DRAM command is transmitted via a command bus of the DRAM bus, the read address is transferred not via an address bus but via a data bus of the DRAM bus.

Similarly, other NAND commands also have different meanings from that of the DRAM command. For example, when a DRAM command indicates "read" of data from a bank address "BA1", the bridge chip 21 converts the DRAM command into a NAND command meaning "read status (Read Status)". That is, when the DRAM command indicates "read" of data from the bank address "BA1", the command is an instruction to read status information. The status information is stored in the bridge chip 21 and indicates completion of a preparation for reading read data, completion of a preparation for writing write data, and the like. The status information is explained later with reference to FIG. 17.

When a DRAM command indicates "write" of data in a bank address "BA2", the bridge chip 21 converts the DRAM command into a NAND command meaning "transmit read address (Write Read Add)". For example, when the status information indicates completion of a preparation for read data, the read data has already been transferred from the NAND memory 22 to the bridge chip 21 and stored in a read buffer in the bridge chip 21. The read data is thus transferrable from the bridge chip 21 to the driver 10. When the bridge chip 21 receives the DRAM command to "write" data in the bank address "BA2" in such a state, the bridge chip 21 receives a read address via a data bus.

When a DRAM command indicates "read" of data from the bank address "BA2", the bridge chip 21 converts the DRAM command into a NAND command meaning "read data (Read Data)". The bridge chip 21 thus transfers data specified by a read address via a data bus to the memory controller 12.

When a DRAM command indicates "write" of data in a bank address "BA4", the bridge chip 21 converts the DRAM command into a NAND command meaning "transmit write address (Write Write Add)". For example, when the status information indicates completion of a preparation for writing write data, the bridge chip 21 receives a write address via a data bus.

When a DRAM command indicates "write" of data in a bank address "BA5", the bridge chip 21 converts the DRAM command into a NAND command meaning "transmit write data (Write Data)". The bridge chip 21 thus receives write data via a data bus.

As explained above, according to the first embodiment, the bridge chip 21 controls the NAND memory 22 by using a combination of a bank address and a DRAM command from the driver 10 as a NAND command different from a DRAM command.

FIGS. 4 to 9 show examples of a configuration of an address, a command, and data from the driver 10 to the NAND memory 22. In FIGS. 4 to 9, upper two columns represent information transmitted via an address bus and a command bus and the bottom column (a third column) represents information transmitted via a data bus. Arrows in FIGS. 4 to 9 denote flows of information (an address, a command, or data). Therefore, it is found in FIGS. 4, 6, and 8 that the driver 10 and the memory controller 12 transmit a read address via a data bus, and the bridge chip 21 and the NAND memory 22 transmit the read address via an address bus. Explanations are given below in detail.

Figure 4:
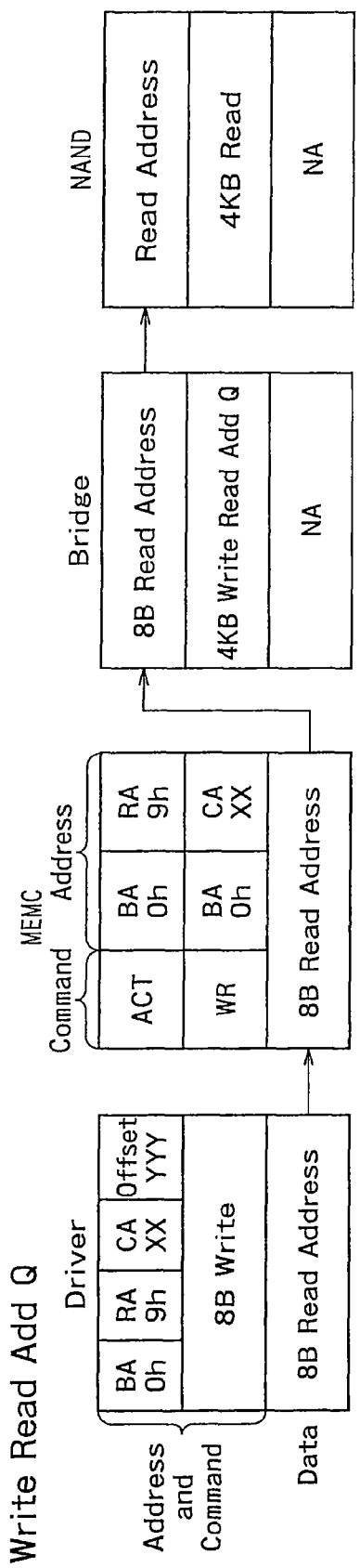

FIG. 4 shows a configuration of an address, a command, and data relating to a NAND command (Write Read Add Q). When a "write" command for the bank address "BA0" is issued in the driver 10, the memory controller (MEMEC) 12 transmits data (a read address) to be written in the bank address "BA0" to the bridge chip 21 as a DRAM command. The write data (the read address) is, for example, 8 bytes. At this time, the bank address and the command are transmitted via an address bus and a command bus to the bridge chip 21, and the write data (the read address) is transmitted via a data bus to the bridge chip 21. The bridge chip 21 handles the write data received from the memory controller 12 as a read address. And also the bridge chip 21 handles the row address (RA) as an access size. For example, RA=9h means 4 KB access as shown in FIG. 16. The bridge chip 21 then stores the read address and data length in "Q(RD_REQ_Q)".

Figure 5:
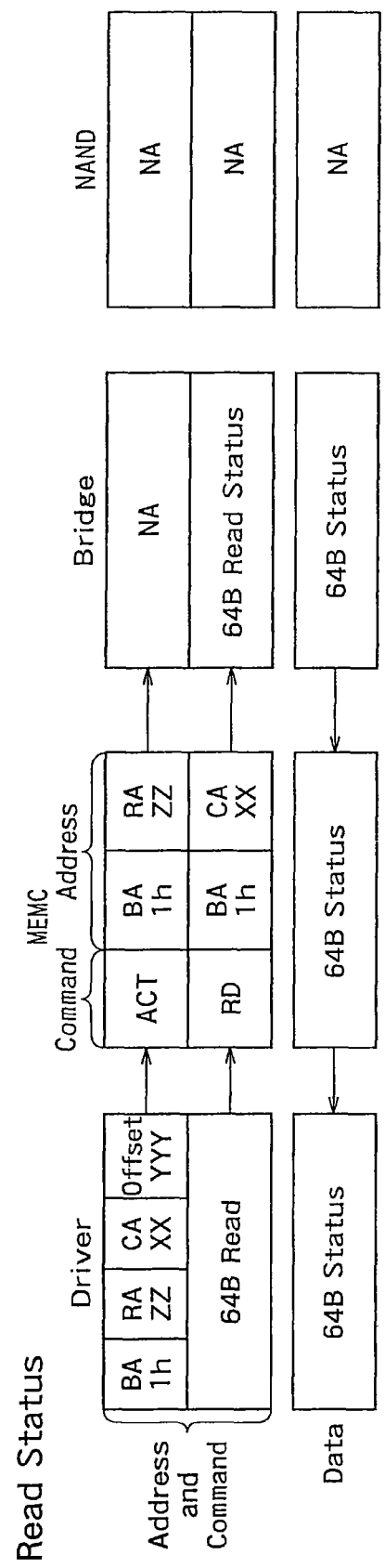

FIG. 5 shows a configuration of an address, a command, and data relating to a NAND command (Read Status). When a "read" command for the bank address "BA1" is issued in the driver 10, the memory controller 12 transmits a command to read data from the bank address "BA1" to the bridge chip 21 as a DRAM command. At this time, the bank address and the command are transmitted via an address bus and a command bus to the bridge chip 21. The bridge chip 21 stores therein status information (for example, 64 bytes) of the memory module 20. The bridge chip 21 thus transmits the status information as data to the memory controller 12 according to the address and the command received from the memory controller 12. The driver 10 can thus recognize a status of the memory module 20.

Figure 6:
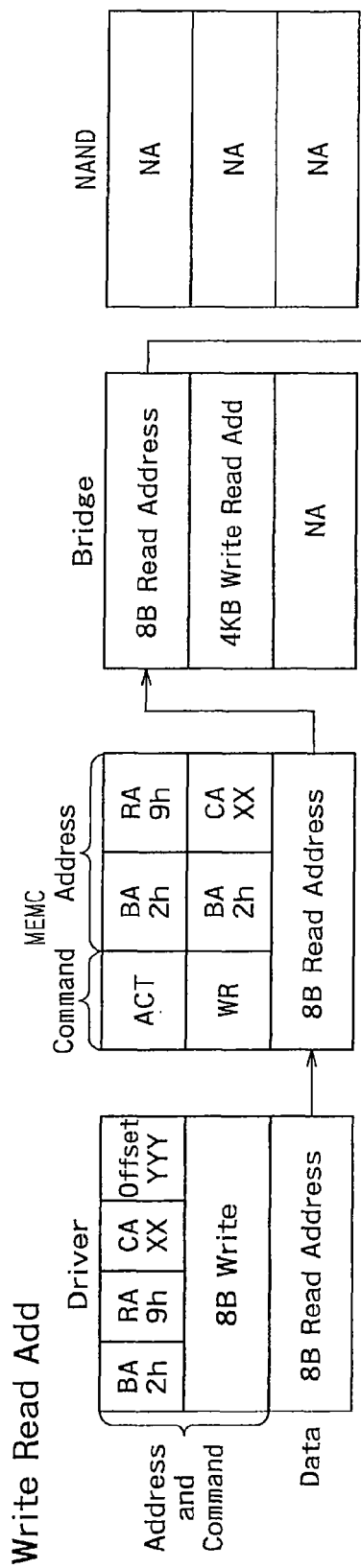

FIG. 6 shows a configuration of an address, a command, and data relating to a NAND command (Write Read Add). When a "write" command for the bank address "BA2" is issued in the driver 10 after status information indicates completion of a preparation for read data as shown in FIG. 5, the memory controller 12 transmits data (a read address) to be written in the bank address "BA2" to the bridge chip 21 as a DRAM command. For example, when a plurality of read requests (read addresses) are stored (held) in "Q(RD_REQ_Q)", data that is actually read into the driver 10 is specified by a read address transmitted according to a NAND command (Write Read Add). At this time, the bank address and the command are transmitted via an address bus and a command bus to the bridge chip 21, and write data (the read address) is transmitted via a data bus to the bridge chip 21. The bridge chip 21 holds the write data received from the memory controller 12 as a read address.

Figure 7:
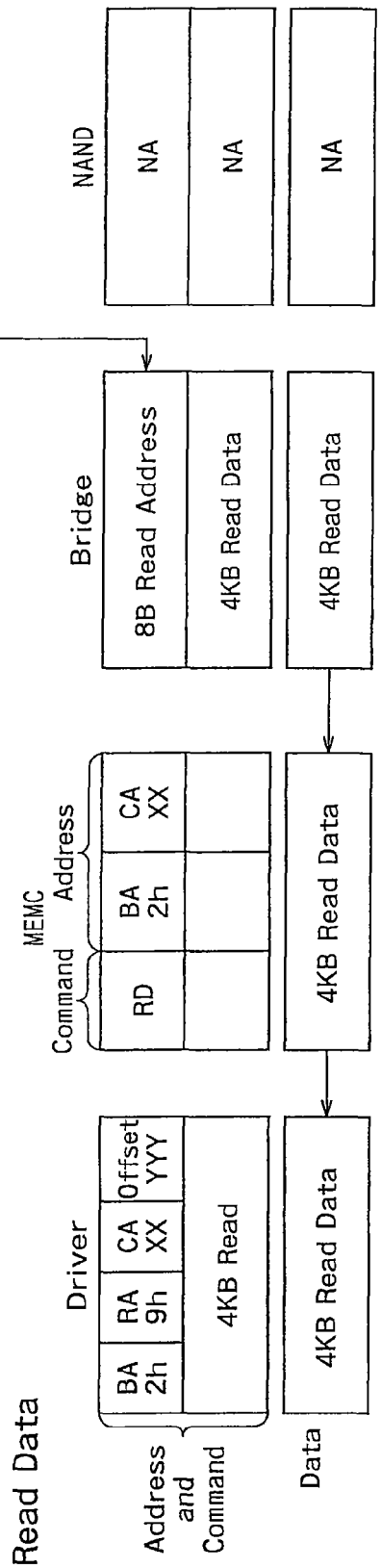

FIG. 7 shows a configuration of an address, a command, and data relating to a NAND command (Read Data). After a read address is written in the bridge chip 21 as shown in FIG. 6, a "read" command for the bank address "BA2" is issued in the driver 10. The memory controller 12 transmits a command to read data from the bank address "BA2" to the bridge chip 21 as a DRAM command. At this time, the bank address and the command are transmitted via an address bus and a command bus to the bridge chip 21. The bridge chip 21 transfers read data (for example, 4 kilobytes) to the memory controller 12 according a held read address.

As shown in FIGS. 6 and 7, the bridge chip 21 receives a read address according to a Write Read Add command and transmits read data corresponding to the read address to the driver 10 by using a Read Data command as a trigger.

FIG. 8 shows a configuration of an address, a command, and data relating to a NAND command (Write Write Add). When a "write" command for the bank address "BA4" is issued in the driver after the status information shown in FIG. 5 indicates completion of a preparation for a write, the memory controller 12 transmits data (a write address) to be written in the bank address "BA4" to the bridge chip 21 as a DRAM command. At this time, the bank address and the command are transmitted via an address bus and a command bus to the bridge chip 21, and the write data (the write address) is transmitted via a data bus to the bridge chip 21. The write data (the write address) is, for example, 8 bytes. The bridge chip 21 holds the write data received from the memory controller 12 as a write address. And also the bridge chip 21 handles the row address (RA) as an access size. For example, RA=9h means 4 KB access as shown in FIG. 16. The bridge chip then stores the write address and data length in "Q(WR_REQ_Q)".

FIG. 9 shows a configuration of an address, a command, and data relating to a NAND command (Write Data). After a write address is written in the bridge chip 21, a "write" command for the bank address "BA5" is issued in the driver 10. The memory controller 12 transmits a command to write data in the bank address "BA5" to the bridge chip 21 as a DRAM command and write data (for example, 4 kilobytes) to the bridge chip 21. At this time, the bank address and the command are transmitted via an address bus and a command bus to the bridge chip 21, and the write data is transmitted via a data bus to the bridge chip 21. The bridge chip 21 writes the write data in the NAND memory 22 according to a held write address.

As shown in FIGS. 8 and 9, the bridge chip 21 receives a write address according to a Write Write Add command, receives write data according to a Write Data command, and writes the write data in the NAND memory 22.

(Read Operation)

Figure 10:
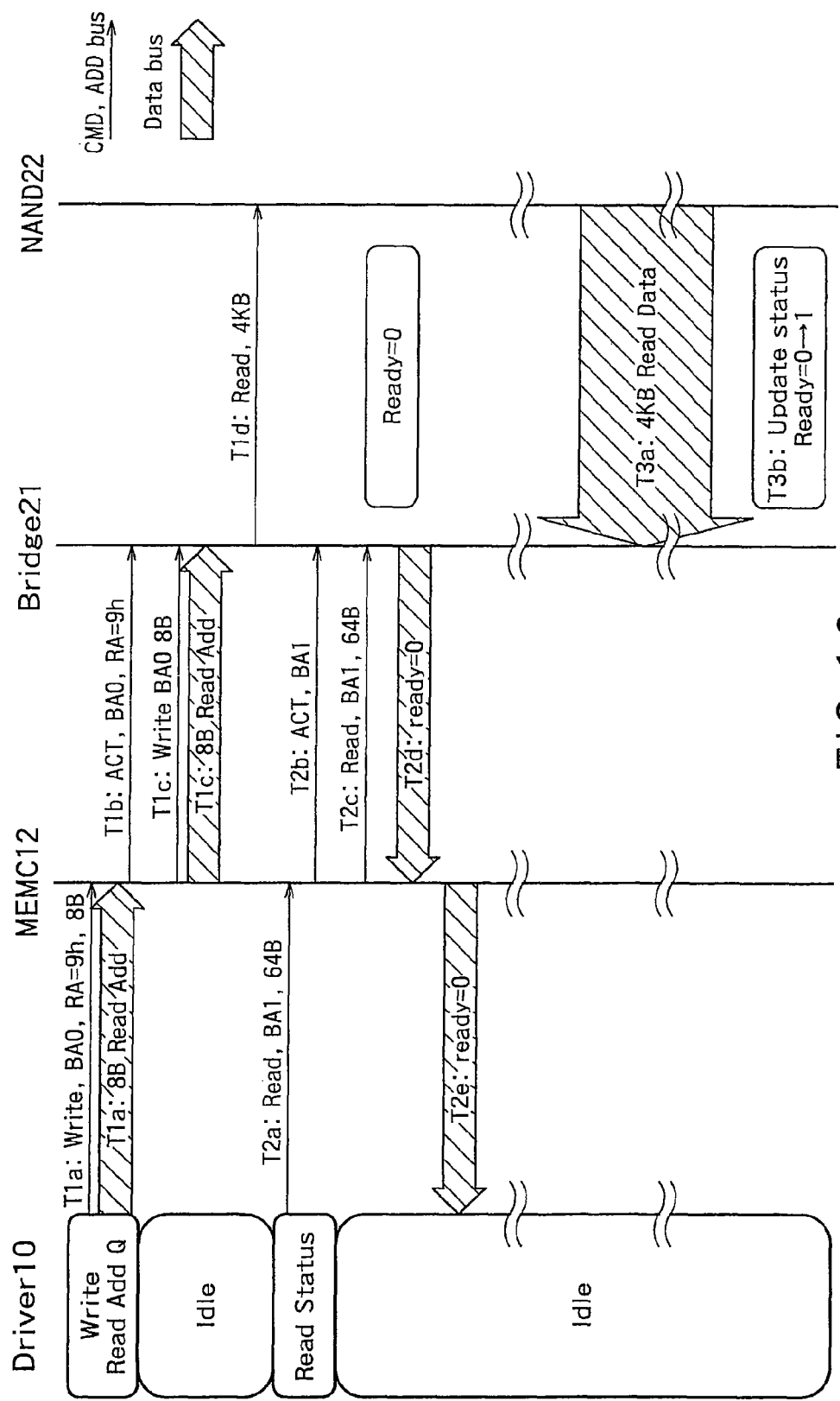
FIGS. 10 and 11 are timing charts of a read operation of the memory system 1 according to the first embodiment.
Figure 11:
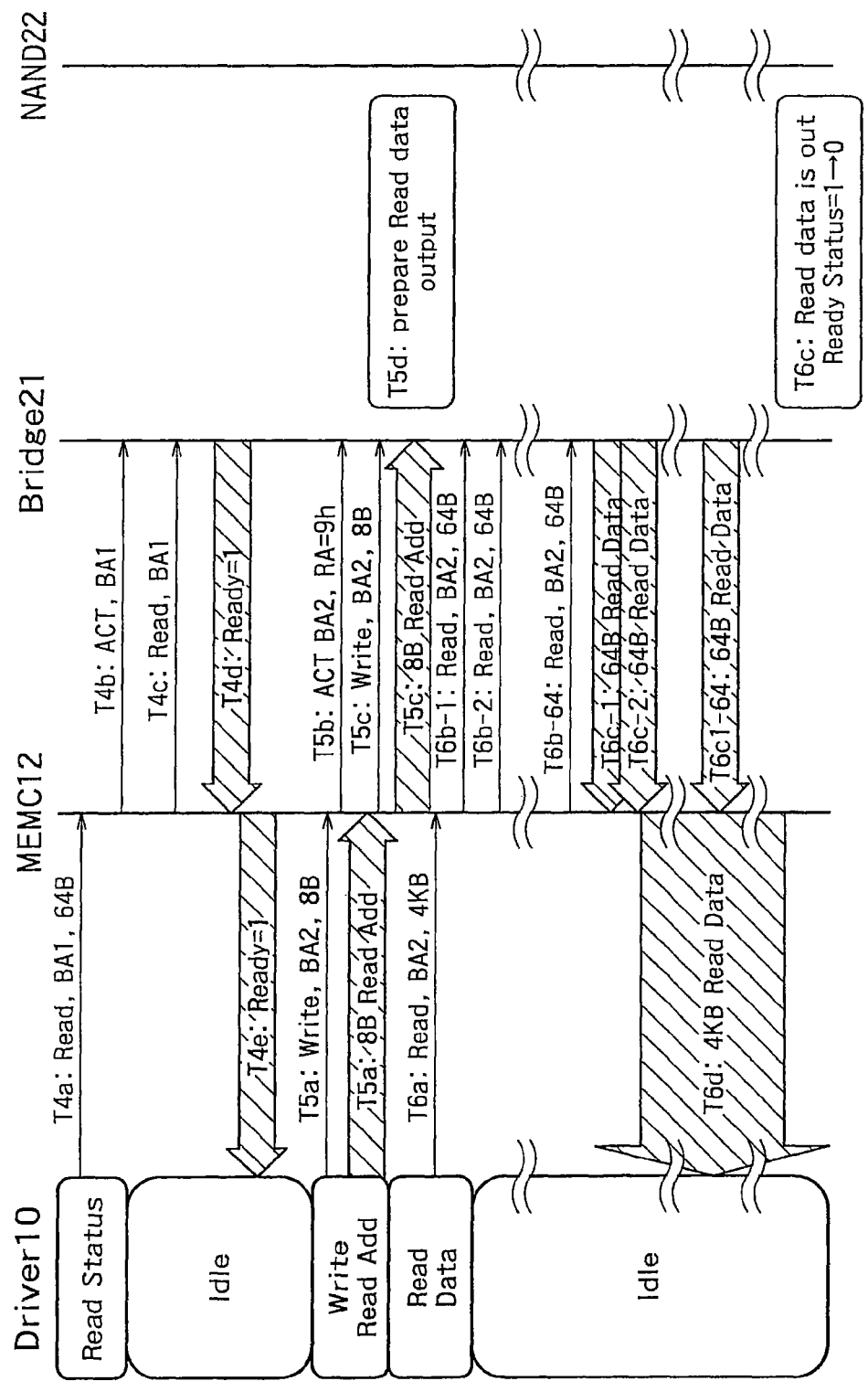

FIGS. 10 and 11 are timing charts of a read operation of the memory system 1 according to the first embodiment.

First, at the time point T1a, the driver 10 issues a write command (Write Read Add Q) for the bank address BA0 and transmits a read address to the memory controller 12 as write data. For example, the driver 10 transmits 8 bytes (64 bits) of write data (the content of data is a read address) via a data bus to the memory controller 12. At this time, the driver 10 also transmits a burst length (9h) of data to be read from the NAND memory 22 via a row address RA (an address bus). 4 kilobytes (9h=4 kilobytes) is specified as the burst length of read data. When the driver 10 has transmitted a command, the driver 10 returns to an idle state. The relationship between the row address RA and the burst length is shown in FIG. 16.

Next, at the time point T1b, the memory controller (MEMC) 12 issues an ACTIVE command for the bank address BA0. At this time, the memory controller 12 also transmits the burst length (9h=4 kilobytes) of the read data as the row address RA via an address bus to the bridge chip 21.

Next, at a time point T1c, the memory controller 12 issues a write command for the bank address BA0 to the bridge chip 21. For example, the memory controller 12 transmits a read address as 8 bytes (64 bits) of write data via a data bus to the bridge chip 21.

Next, at a time point T1d, the bridge chip 21 recognizes that the write command for the bank address BA0 is a Write Read Add Q command based on the truth table of FIG. 3, and recognizes 8 bytes of data obtained via the data bus as a read address. Information received as the row address RA is recognized as the burst length of data to be read from the NAND memory 22. The bridge chip 21 thus issues a read command to the NAND memory 22 and registers a request (a read request) to read data from a read address in "Q(RD_REQ_Q)".

The NAND memory 22 starts a data read operation in response to a read request.

Next, at a time point T2a, the driver 10 issues a read command (Read Status) for the bank address BA1. For example, status information is 64 bytes of information. In this case, a read command specifies a burst length of 64 bytes. When the driver 10 has transmitted a command, the driver 10 returns to an idle state.

Next, at a time point T2b, the memory controller 12 issues an ACTIVE command for the bank address BA1 to the bridge chip 21.

Next, at a time point T2c, the memory controller 12 issues a read command for the bank address BA1 to the bridge chip 21.

Next, at a time point T2d, the bridge chip 21 recognizes that the read command for the bank address BA1 is a Read Status command based on the truth table of FIG. 3, and transmits 64 bytes of status information to the memory controller 12 as read data. The status information is transmitted via the data bus. When the data requested to be read at the time point T1*d* has not been read from the NAND memory 22 into the bridge chip 21 (when a preparation for reading read data has not been completed), the status information includes Ready=0.

At a time point T2*e*, the memory controller 12 transmits the status information to the driver 10. The driver 10 can thus recognize that a preparation for reading read data has not been completed in the bridge chip 21. Therefore, the driver 10 keeps an idle state. An operation of checking status information at the time point T2*e* is periodically performed according to specifications of a DRAM.

At a time point T3*a*, the NAND memory 22 transmits 4 kilobytes of read data to the bridge chip 21. The read data is stored in a read buffer in the bridge chip 21. When a preparation for reading read data is completed, at a time point T3*b*, the bridge chip 21 deletes the corresponding read request registered in "Q(RD_REQ_Q)" and registers this read request in "Q(RD_CMP_Q)". The status information is then changed to Ready=1. While "Q(RD_REQ_Q)" is Q that stores therein a read request in process, "Q(RD_CMP_Q)" is Q that stores therein a completed read request.

Next, at time points T4*a* to T4*e* shown in FIG. 11, status information is checked, similarly to the time points T2*a* to T2*e*. Because a preparation for reading read data is completed, the status information includes Ready=1.

At the time point T4*e*, the memory controller 12 transmits the status information to the driver 10. The driver 10 thus recognizes that a preparation for reading read data is completed in the bridge chip 21.

Next, at a time point T5*a*, the driver 10 issues a write command (Write Read Add) for the bank address BA2 and transmits a read address to the memory controller 12 as write data. For example, the driver 10 transmits 8 bytes (64 bits) of write data (the content of data is a read address) via a data bus to the memory controller 12. At this time, the driver 10 also transmits a burst length (9h) of data to be read from the NAND memory 22 via a row address RA (an address bus) to the memory controller 12. As explained above, the burst length of read data is, for example, 4 kilobytes (9h=4 kilobytes). When the driver 10 has transmitted a command, the driver 10 returns to an idle state.

Next, at a time point T5*b*, the memory controller 12 issues an ACTIVE command for the bank address BA2. At this time, the memory controller 12 also transmits the burst length (9h=4 kilobytes) of the read data as the row address RA via an address bus to the bridge chip 21.

Next, at a time point T5*c*, the memory controller 12 issues a write command for the bank address BA2 to the bridge chip 21. For example, the memory controller 12 transmits 8 bytes (64 bits) of write data (the content of data is a read address) via a data bus to the bridge chip 21.

Next, at a time point T5*d*, the bridge chip 21 recognizes that the write command for the bank address BA2 is a Write Read Add command based on the truth table of FIG. 3, and recognizes 8 bytes of data obtained via the data bus as a read address. Information received as the row address RA is recognized as the burst length of the data to be read from the NAND memory 22. The bridge chip 21 then prepares for outputting data corresponding to the read address.

Next, at a time point T6*a*, the driver 10 issues a read command (Read Data) for the bank address BA2. The burst length for the memory controller 12 is 4 kilobytes. When the driver 10 has transmitted a command, the driver 10 returns to an idle state.

At a time point T6*b*, the memory controller 12 issues a read command for the bank address BA2 to the bridge chip 21. The bank address BA2 is identical to the bank address BA2 transmitted at T5*a*. Therefore, the read command is for the data prepared at T5*d* mentioned above. Because the burst length is specified, a read command is issued for the number of times required. For example, assuming that 8×64 bits=64 bytes of data is read by one read command, when 4 kilobytes of data is read, the memory controller 12 issues a read command for 64 times in total (T6*b*-1 to T6*b*-64).

At time points T6*c*-1 to T6*c*-64, the bridge chip 21 recognizes that the read command for the bank address BA2 is a Read Data command based on the truth table of FIG. 3, and transmits data prepared in the bridge chip 21 to the memory controller 12. When 64 read commands are issued, the bridge chip 21 transmits 4 kilobytes (64 bytes×64=4 kilobytes) of data to the memory controller 12. When read data has been transmitted, the bridge chip 21 returns Ready of the status information to 0.

Next, at a time point T6*d*, the memory controller 12 transmits 4 kilobytes of read data to the driver 10. While the bridge chip 21 and the memory controller 12 transmit 4 kilobytes of data in a batch in the first embodiment, data can be divided into pieces of an arbitrary length (a burst length) and transmitted.

(Write Operation)

Figure 12:
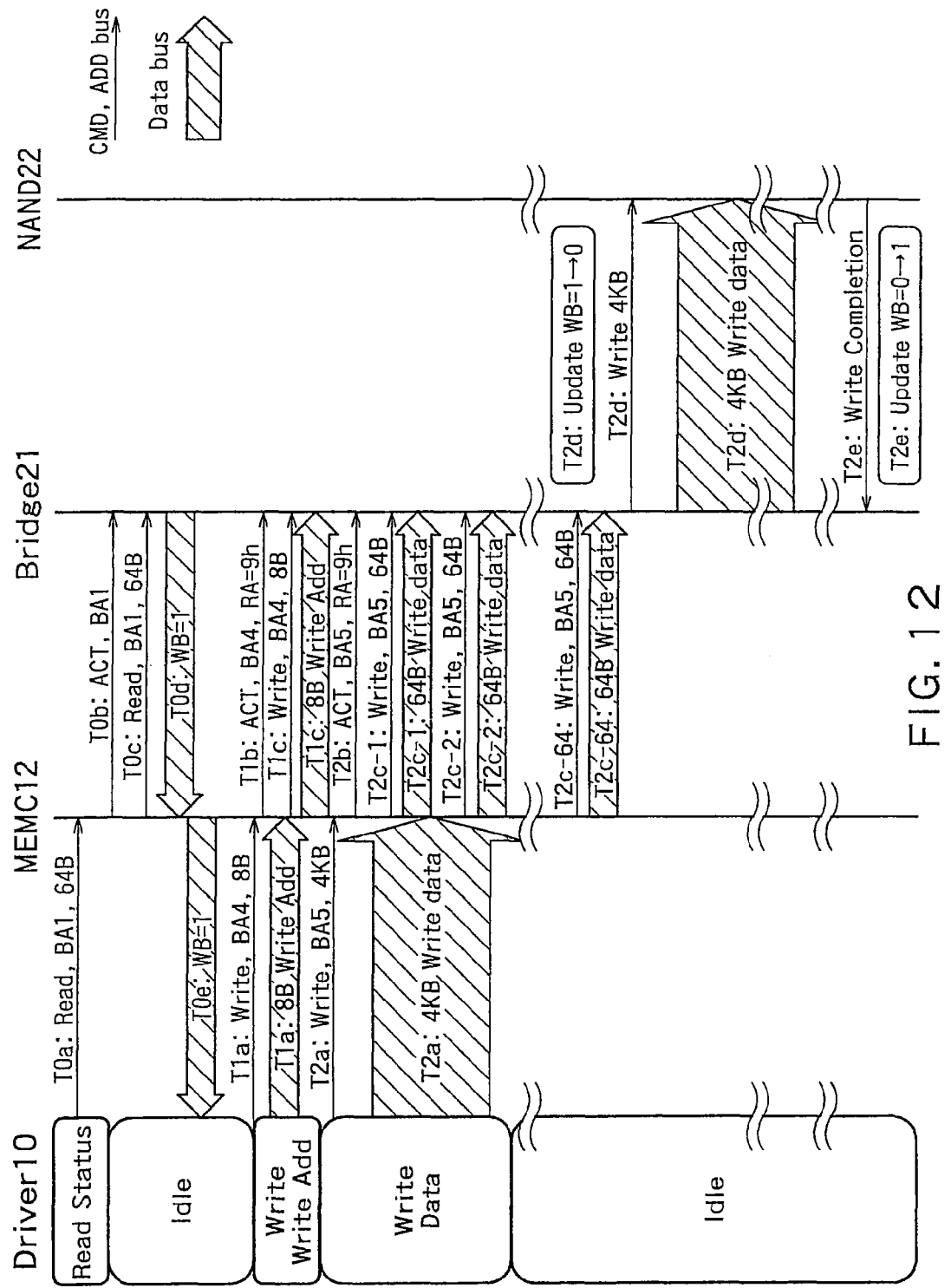
FIG. 12 is a timing chart of a write operation of the memory system 1 according to the first embodiment.

FIG. 12 is a timing chart of a write operation of the memory system 1 according to the first embodiment.

At a time point T0*a*, the driver 10 issues a read command (Read Status) for the bank address BA1. This is because status information includes a WB register indicating whether there is a free space in a write buffer in the bridge chip 21. For example, when the status information is 64 bytes of information, a read command specifies a burst length of 64 bytes. When the driver 10 has transmitted a command, the driver 10 returns to an idle state. When it is already found in the driver 10 that there is a free space in the write buffer in the bridge chip 21, the Read Status command does not need to be issued.

Next, at a time point T0*b*, the memory controller 12 issues an ACTIVE command for the bank address BA1 to the bridge chip 21.

Next, at a time point T0*c*, the memory controller 12 issues a read command for the bank address BA1 to the bridge chip 21.

Next, at a time point T0*d*, the bridge chip 21 recognizes that the read command for the bank address BA1 is a Read Status command based on the truth table of FIG. 3, and transmits 64 bytes of status information to the memory controller 12 as read data. The status information is transmitted via a data bus.

At a time point T0*e*, the memory controller 12 transmits the status information to the driver 10. The driver 10 refers to a WB register out of 64 bytes of the status information and determines whether there is a free space in the write buffer. For example, when the WB register is 1, the driver 10 judges that there is a free space in the write buffer.

Next, when there is a free space in the write buffer, at the time point T1*a*, the driver 10 issues a write command (Write Write Add) for the bank address BA4 and transmits a write address as write data. For example, the driver 10 transmits 8 bytes (64 bits) of write data (the content of data is a write address) via a data bus to the memory controller 12. At this time, the driver 10 also transmits a burst length (9h) of data to be written in the NAND memory 22 via a row address RA (an address bus). As explained above, the burst length of write data is, for example, 4 kilobytes (9h=4 kilobytes). When the driver 10 has transmitted a command, the driver 10 returns to an idle state.

Next, at the time point T1b, the memory controller 12 issues an ACTIVE command for the bank address BA4. At this time, the memory controller 12 also transmits the burst length (9h=4 kilobytes) of the write data as the row address RA via an address bus to the bridge chip 21.

Next, at the time point T1c, the memory controller 12 issues a write command for the bank address BA4 to the bridge chip 21. For example, the memory controller 12 transmits 8 bytes (64 bits) of write data (the content of data is a write address) via a data bus to the bridge chip 21.

Next, at the time point T2a, the driver 10 issues a write command (Write Data) for the bank address BA5. In this case, 4 kilobytes is specified as the burst length of write data. When the driver 10 has transmitted write data, the driver 10 returns to an idle state.

Next, at the time point T2b, the memory controller 12 issues an ACTIVE command for the bank address BA5. At this time, the memory controller 12 also transmits the burst length (9h=4 kilobytes) of the write data to the bridge chip 21 as the row address RA.

Next, at the time point T2c, the memory controller 12 issues a write command for the bank address BA5 to the bridge chip 21. In this case, a write command is issued for the number of times required according to a burst length. For example, assuming that 8×64 bits=64 bytes of data is written in a write buffer by one write command, to write 4 kilobytes of data, the memory controller 12 issues a write command for 64 times in total (T2c-1 to T2c-64). A request to write data in a write address (a write request) is registered in "Q(WR_REQ_Q)". When the write buffer runs out of space, WB of the status information becomes 0. For convenience, according to the memory system 1 of the first embodiment, a value of the WB register is changed assuming that the write buffer runs out of space in one write operation. However, the memory system 1 can perform a plurality of write requests successively until no space is left in the write buffer.

Next, at the time point T2d, the bridge chip 21 recognizes that the write command for the bank address BA5 is a Write Data command based on the truth table of FIG. 3, and recognizes 4 kilobytes of data obtained via the data bus as write data. The write data is written in the write buffer in the bridge chip 21.

The bridge chip 21 then writes the write data stored in the write buffer in the NAND memory 22 according to the write address received at T1c.

Next, at the time point T2e, when the bridge chip 21 receives a write completion notification from the NAND memory 22, the bridge chip 21 returns the WB register to 1. When the status information includes information about the free space in the write buffer in the bridge chip 21, the bridge chip 21 can add the capacity of data that has been written in the NAND memory 22 to the free space in the write buffer. Further, the bridge chip 21 deletes the write request registered in "Q(WR_REQ_Q)". If the bridge chip 21 has "Q(WR_COMP_Q)" indicating completion of a write request, the write request can be registered in WR_CMP_Q.

(Multi-Read/Multi-Write)

Figure 13:
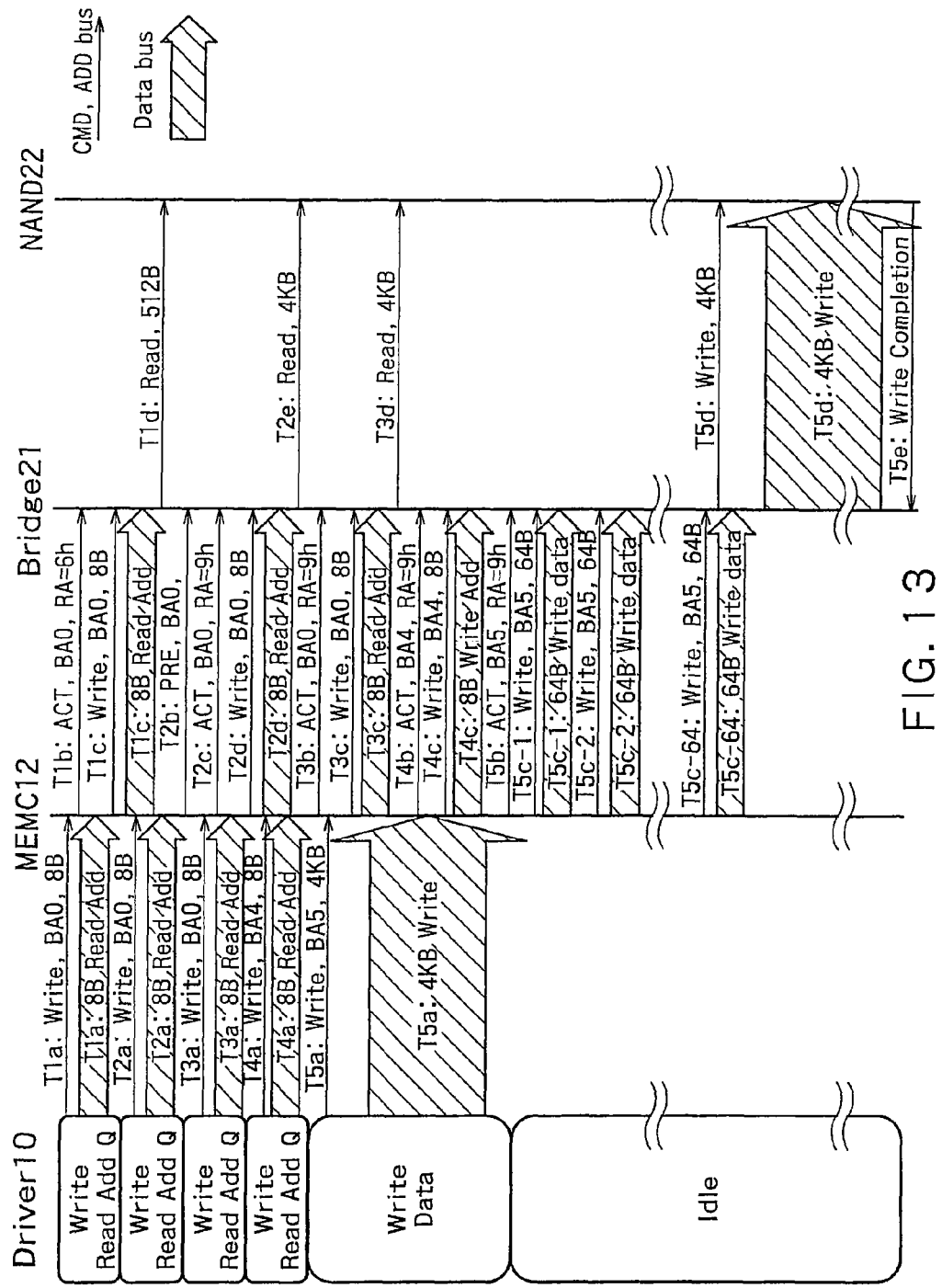
FIGS. 13 and 14 are timing charts of an operation of holding a plurality of access requests (read requests and/or write requests) in "Q(RD_REQ_Q)" or "Q(WR_REQ_Q)" and then sequentially performing the requests.
Figure 14:
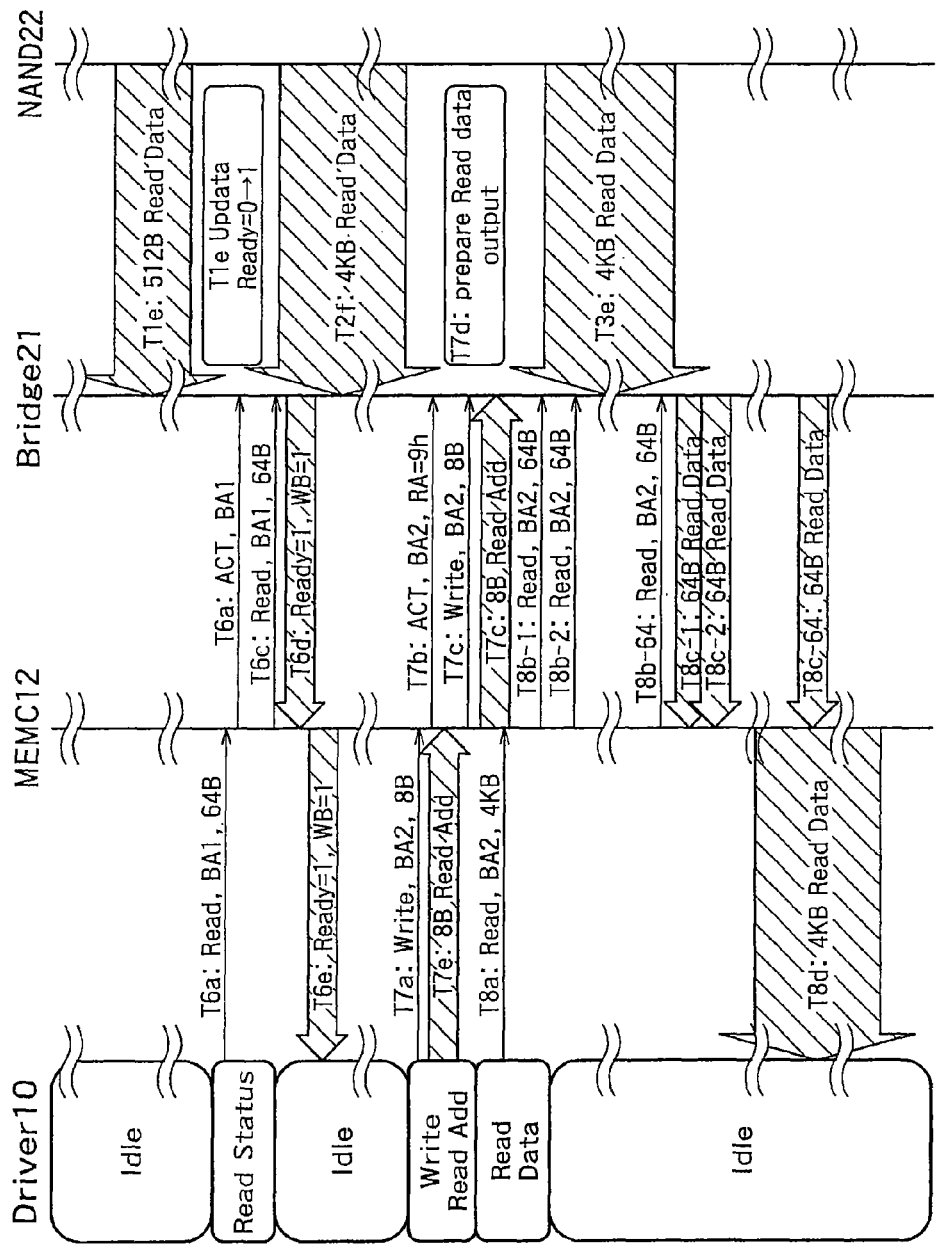

FIGS. 13 and 14 are timing charts of an operation of holding a plurality of access requests (read requests and/or write requests) in "Q(RD_REQ_Q)" or "Q(WR_REQ_Q)" and then sequentially performing the requests.

First, at the time point T1a, the driver 10 issues a write command (Write Read Add Q) for the bank address BA0 and transmits a read address to the memory controller 12 as write data. For example, the driver 10 transmits 8 bytes (64 bits) of write data (the content of data is a read address) via a data bus to the memory controller 12. At this time, the driver 10 also transmits a burst length (6h) of data to be read from the NAND memory 22 via a row address RA (an address bus). 512 bytes (6h=512 bytes) is specified as the burst length of read data.

Next, at the time point T1b, the memory controller 12 issues an ACTIVE command for the bank address BA0. At this time, the memory controller 12 also transmits the burst length (6h=512 bytes) of the read data as the row address RA via an address bus to bridge chip 21.

Next, at the time point T1c, the memory controller 12 issues a write command for the bank address BA0 to the bridge chip 21. For example, the memory controller 12 transmits a read address as 8 bytes (64 bits) of write data via a data bus to the bridge chip 2.

Next, at a time point T1d, the bridge chip 21 recognizes that the write command for the bank address BA0 is a Write Read Add Q command based on the truth table of FIG. 3, and recognizes 8 bytes of data obtained via the data bus as a read address. Information received as the row address RA is recognized as the burst length of the data to be read from the NAND memory 22. The bridge chip 21 thus issues a read command to the NAND memory 22 and registers a request (a read request) to read data from a read address in "Q(RD_REQ_Q)".

The NAND memory 22 starts a data read operation in response to a read request.

In practice, there is a time lag from when the bridge chip 21 transmits a read request to the NAND memory 22 to when the bridge chip 21 receives data from the NAND memory 22. As a result, there is a case where a plurality of read requests or write requests are stuck in "Q(RD_REQ_Q)" or "Q(WR_REQ_Q)" in the bridge chip 21, as explained below.

At the time point T2a, the driver 10 issues a write command (Write Read Add Q) for the bank address BA0 and transmits a read address to the memory controller 12 as write data. At this time, the driver 10 also transmits a burst length (9h) of data to be read from the NAND memory 22 via a row address RA (an address bus). In this case, 4 kilobytes (9h=4 kilobytes) is specified as the burst length of read data.

At the time point T2b, the memory controller 12 issues a PRE command for the bank address BA0. The PRE command is a command output according to a change in the row address RA in specifications of a DRAM, and is issued because the burst length is changed from 512 bytes to 4 kilobytes in the first embodiment. Because a bridge chip does not require a pre-charge operation in the first embodiment, the bridge chip 21 ignores the PRE command.

Operations at the time points T2c to T2e are identical to the operations at the time points T1b to T1d, except for the burst length of read data.

At the time point T3a, the driver 10 issues a write command (Write Read Add Q) for the bank address BA0 and transmits a read address to the memory controller 12 as write data. At this time, the driver 10 also transmits a burst length (9h) of data to be read from the NAND memory 22 via a row address RA (an address bus) to the memory controller 12. In this case, 4 kilobytes (9h=4 kilobytes) is specified as the burst length of read data.

Operations at time points T3b to T3d are identical to the operations at the time points T1b to T1d, except for the burst length of read data.

Next, at the time point T4a, the driver 10 issues a write command (Write Write Add) for the bank address BA4 and transmits a write address to the memory controller 12 as write data. For example, the driver 10 transmits 8 bytes (64 bits) of write data (the content of data is a write address) via a data bus to the memory controller 12. At this time, the driver 10 also transmits a burst length (9h) of data to be written in the NAND memory 22 via a row address RA (an address bus). As explained above, the burst length of write data is, for example, 4 kilobytes (9h=4 kilobytes). At this time, it is assumed that there is a sufficient space in a write buffer in the bridge chip 21.

Next, at the time point T4b, the memory controller 12 issues an ACTIVE command for the bank address BA4. At this time, the memory controller 12 transmits the burst length (9h=4 kilobytes) of read data as the row address RA via an address bus to the bridge chip 21.

Next, at the time point T4c, the memory controller 12 issues a write command for the bank address BA4 to the bridge chip 21. For example, the memory controller 12 transmits 8 bytes (64 bits) of write data (the content of data is a write address) via a data bus to the bridge chip 21.

Next, at the time point T5a, the driver 10 issues a write command (Write Data) for the bank address BA5. In this case, 4 kilobytes (9h=4 kilobytes) is specified as the burst length of write data. When the driver 10 has transmitted write data, the driver 10 returns to an idle state.

As explained above, according to an example shown in FIG. 13, three read requests are stuck in "Q(RD_REQ_Q)" in the bridge chip 21 and one write request is stuck in "Q(WR_REQ_Q)" in the bridge chip 21.

Thereafter, operations at T5b to T5e are identical to the operations at T2b to T2e in FIG. 12. In this manner, the write operation is completed. The bridge chip 21 deletes the corresponding write request registered in "Q(WR_REQ_Q)" and registers this write request in "Q(WR_CMP_Q)".

Meanwhile, at a time point T1e in FIG. 14, 512 bytes of read data is transmitted from the NAND memory 22 to the bridge chip 21 in response to the read request at T1d in FIG. 13. Accordingly, when a preparation for reading read data is completed, the bridge chip 21 deletes the corresponding read request registered in "Q(RD_REQ_Q)" and registers this read request in "Q(RD_CMP_Q)". The bridge chip 21 then changes status information to Ready=1.

At a time point T2f in FIG. 14, 4 kilobytes of read data is transmitted from the NAND memory 22 to the bridge chip 21 in response to the read request at T2e in FIG. 13. The read data is stored in a read buffer in the bridge chip 21. Therefore, when a preparation for reading read data is completed, the bridge chip 21 deletes the corresponding read request registered in "Q(RD_REQ_Q)" and registers this read request in "Q(RD_CMP_Q)". The status information keeps Ready=1.

At a time point T3e in FIG. 14, 4 kilobytes of read data is transmitted from the NAND memory 22 to the bridge chip 21 in response to the read request at T3d in FIG. 13. The read data is stored in the read buffer in the bridge chip 21. Accordingly, when a preparation for reading read data is completed, the bridge chip 21 deletes the corresponding read request registered in "Q(RD_REQ_Q)" and registers this read request in "Q(RD_CMP_Q)". The status information keeps Ready=1.

After the time point T1e, at time points T6a to T6e, the status information of the bridge chip 21 is checked. Operations of checking status information at T6a to T6e can be identical to the operations at the time points T2a to T2e or the time points T4a to T4e shown in FIG. 11.

When the status information corresponding to a read request includes Ready=1, a preparation for reading read data in response to the read request is completed. Therefore, the driver 10 issues a write command (Write Read Add) for the bank address BA2 at a time point T7a. Operations at time points T7a to T7d can be identical to the operations at T5a to T5d in FIG. 11. Operations at time points T8a to T8d can be identical to the operations at T6a to T6d in FIG. 11.

As explained above, the memory system 1 according to the first embodiment can hold a plurality of read requests and/or write requests in "Q(RD_REQ_Q)" or "Q(WR_REQ_Q)" in the bridge chip 21 and then perform the requests sequentially.

FIG. 15 is a table representing a priority and an interrupt of a read request and a write request. When a large number of write requests are registered in Q(WR_REQ_Q), it takes time before a subsequent read request is processed. The memory system 1 can thus prioritize read requests and process preferentially a read request with a high priority. That is, the memory system 1 can permit an interrupt of a read request with a high priority. In this case, for example, at least one bit of a row address RA is allocated to a bit indicating a priority, thereby identifying a read request to be processed preferentially.

For example, as shown in FIG. 15, it is assumed that three write requests (with a low priority) are registered in Q(WR_REQ_Q), and then a read request (with a high priority) is registered in Q(RD_REQ_Q). When an interrupt is prohibited, the write requests and the read request are processed in the order of registration. Therefore, the read request is processed fourth. On the other hand, when an interrupt is permitted, the read request is processed first according to the priority. In this manner, the memory system 1 according to the first embodiment can permit an interrupt of a write request or a read request.

FIG. 16 is a table representing a relationship between a row address RA and a burst length. When a row address RA is transmitted together with an ACTIVE command as a burst length, it suffices that some bits of the row address RA are allocated to the burst length as shown in FIG. 16. For example, the burst length is represented by using lower 6 bits of the row address RA, and upper 11 bits are fixed at 000h. When a burst length of 4 kilobytes is specified, the row address RA is 00009h. When a burst length of 512 bytes is specified, the row address RA is 00006h. The relationship between the row address RA and the burst length is applicable to the second embodiment, too.

FIG. 17 is a table of an example of a status register that stores therein status information. It is assumed that the status information can include, for example, 64 bytes (64 bits of data bus×burst length 8=512 bits) of information. In this case, the status information can include information indicating whether read data is stored in a read buffer (whether read data is prepared), information indicating whether there is a space in a write buffer, information about the usage of a buffer, information about a free space in the buffer, and the like. In addition, the status information can include information indicating the approximate time until read data is stored in a buffer of the bridge chip 21 and information about the number of data write/erasure processes and any background operation before a read operation starts.

It is needless to mention that the capacity of the status information can be reduced to less than 64 bytes or be expanded to 64 bytes or more.

As explained above, the memory system 1 according to the first embodiment controls the memory module 20 including the NAND memory 22 by using a DRAM controller.

According to the first embodiment, the memory controller 12 transmits an address as write data via a data bus of a DRAM bus to the bridge chip 21. The bridge chip 21 receives write data via the data bus from the memory controller 12 and recognizes the write data as an address based on an address of a write destination of the write data. The bridge chip 21 then transmits the address via an address bus to the NAND memory 22. It is needless to mention that the DRAM data bus can transfer a larger amount of data than the address bus and thus even when a DRAM protocol is used, all addresses in the NAND memory 22 can be specified. That is, when the NAND memory 22 connected to the DRAM bus is controlled, accessible address space can be expanded regardless of the number of address buses of a DRAM.

According to the first embodiment, the bridge chip 21 can register a read request or a write request as a queue, and has status information that indicates completion of a preparation for reading read data, a free space of in a write buffer, and the like. As a result, the driver 10 can read the status information in the bridge chip 21 periodically and check a preparation for reading read data or a preparation for writing write data. While the latency of the NAND memory 22 is longer than that of a DRAM, the driver 10 can issue a read command or a write command after a preparation for reading read data or a preparation for writing write data is completed. That is, the bridge chip 21 transmits status information back to the memory controller 12, so that the NAND memory 22 can be controlled by a DRAM protocol.

According to the first embodiment, the bridge chip 21 can register a plurality of read requests or write requests as a queue. The driver 10 can thus issue a plurality of commands in parallel before each read request or write request is completed.

As explained above, according to the first embodiment, the bridge chip 21 controls the NAND memory 22 by using a combination (a DRAM command) of an address and a command from the driver 10 as a NAND command different from the DRAM command. As a result, the memory system 1 according to the first embodiment can control the NAND memory 22 sufficiently by using a DRAM protocol.

(Second Embodiment)

According to a second embodiment, addresses issued by a plurality of commands from the driver 10 are combined into one address. That is, while the driver 10 transmits an address via a data bus to the bridge chip 21 in the first embodiment, the driver 10 divides one address into pieces and transmits the divided pieces via an address bus to the bridge chip 21 in the second embodiment. Configurations of the memory system 1 according to the second embodiment can be identical to those shown in the FIG. 1.

Figure 18:
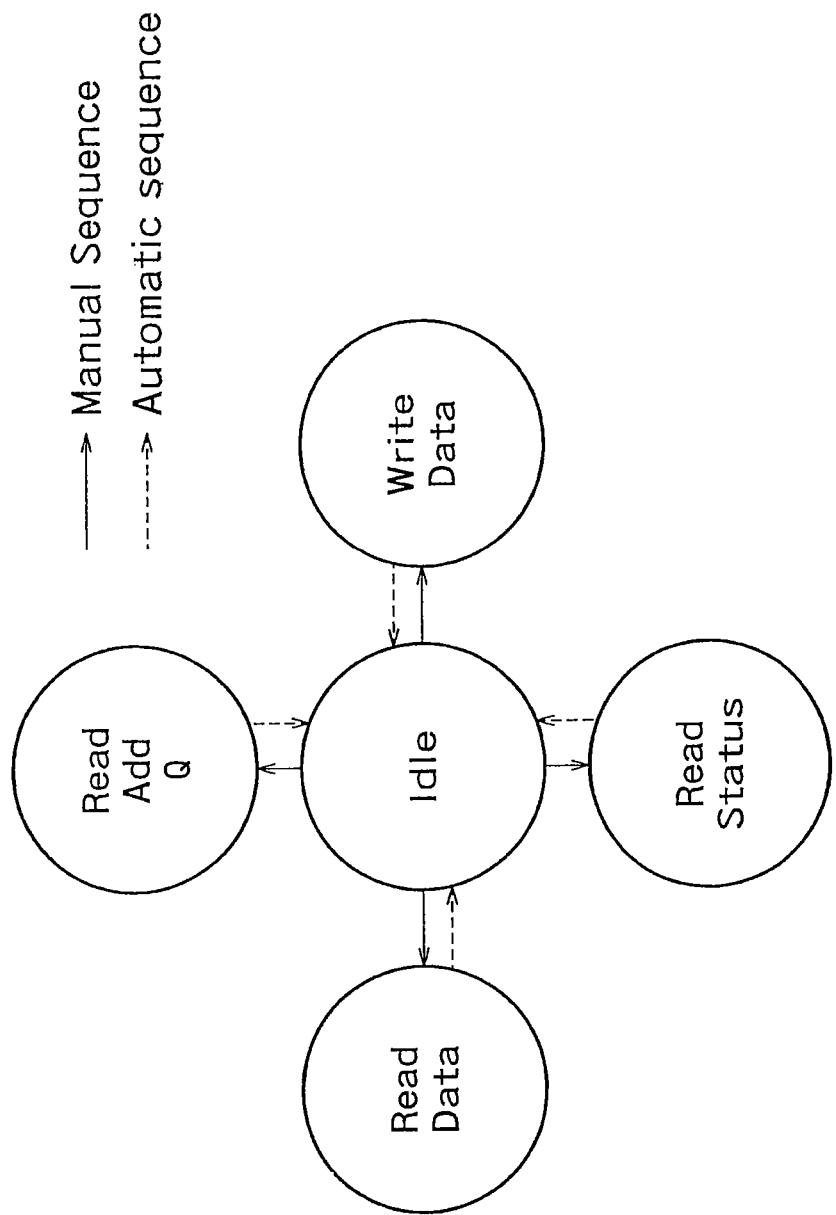
FIG. 18 is a state diagram of the driver 10 according to the second embodiment.

FIG. 18 is a state diagram of the driver 10 according to the second embodiment. FIG. 19 is a command truth table in the bridge chip 21. FIG. 18 shows a transition from an idle state to each state. A solid line denotes a transition by a command and a broken line denotes an automatic return to an idle state after a command is executed.

With reference to FIG. 19, an address and a command output from the driver 10 are converted via the bridge chip 21 to have a meaning of a NAND command different from that of a DRAM command. The bridge chip 21 controls the NAND memory 22 by using a combination of an address and a DRAM command from the driver 10 as a NAND command different from a DRAM command.

For example, when a DRAM command indicates "read" of data from a bank address "BA0", the bridge chip 21 converts the DRAM command into a NAND command meaning "register read address in Q(RD_REQ_Q) (Read Add Q)".

When a DRAM command indicates "read" of data from a bank address "BA1", the bridge chip 21 converts the DRAM command into a NAND command meaning "read status (Read Status)".

When a DRAM command indicates "read" of data from a bank address "BA2", the bridge chip 21 converts the DRAM command into a NAND command meaning "read data (Read Data)".

When a DRAM command indicates "write" of data in a bank address "BA3", the bridge chip 21 converts the DRAM command into a NAND command meaning "transmit write data (Write Data)".

Figure 20:
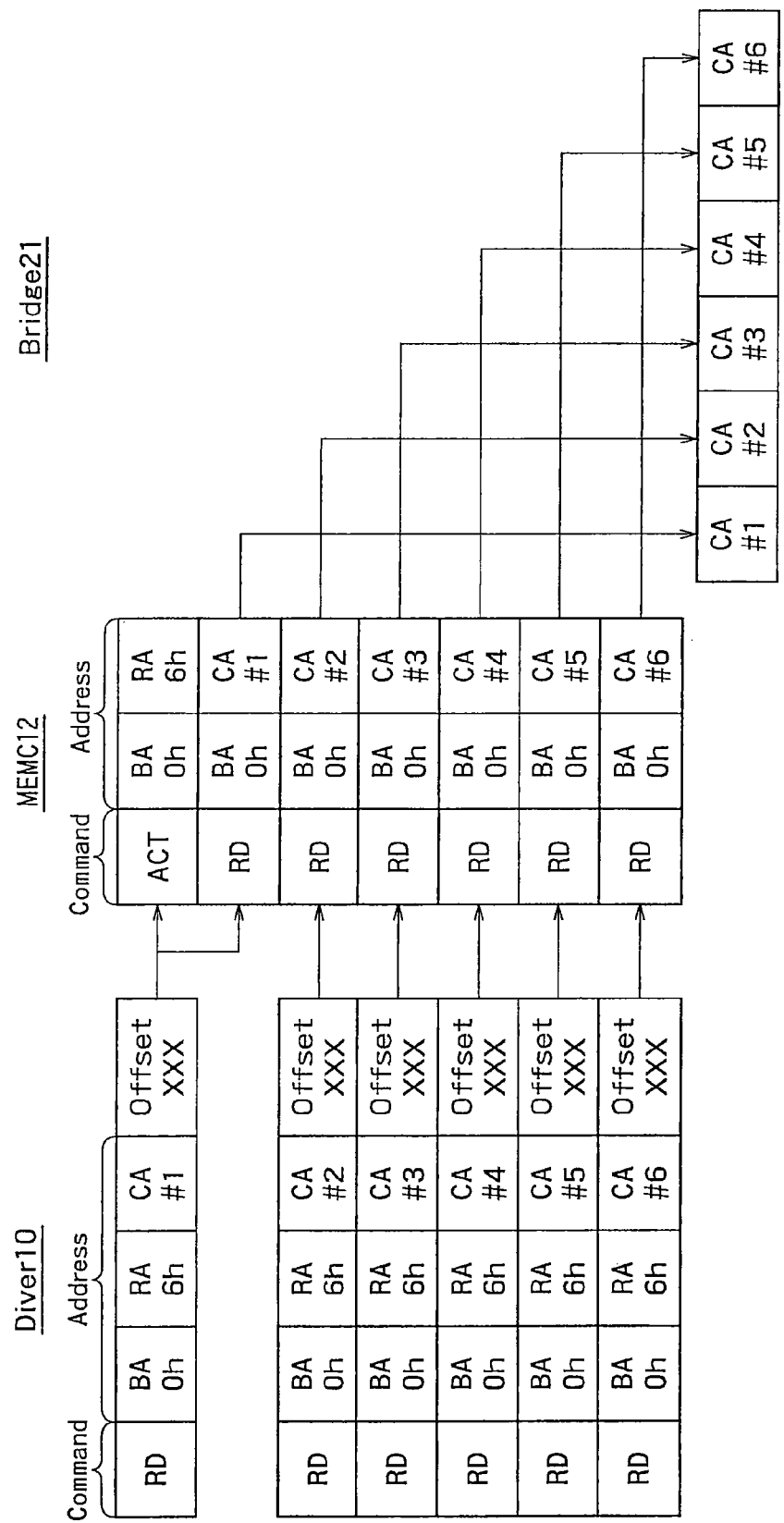
FIGS. 20 and 21 show an example of a configuration of an address and a command from the driver 10 to the bridge chip 21.
Figure 21:
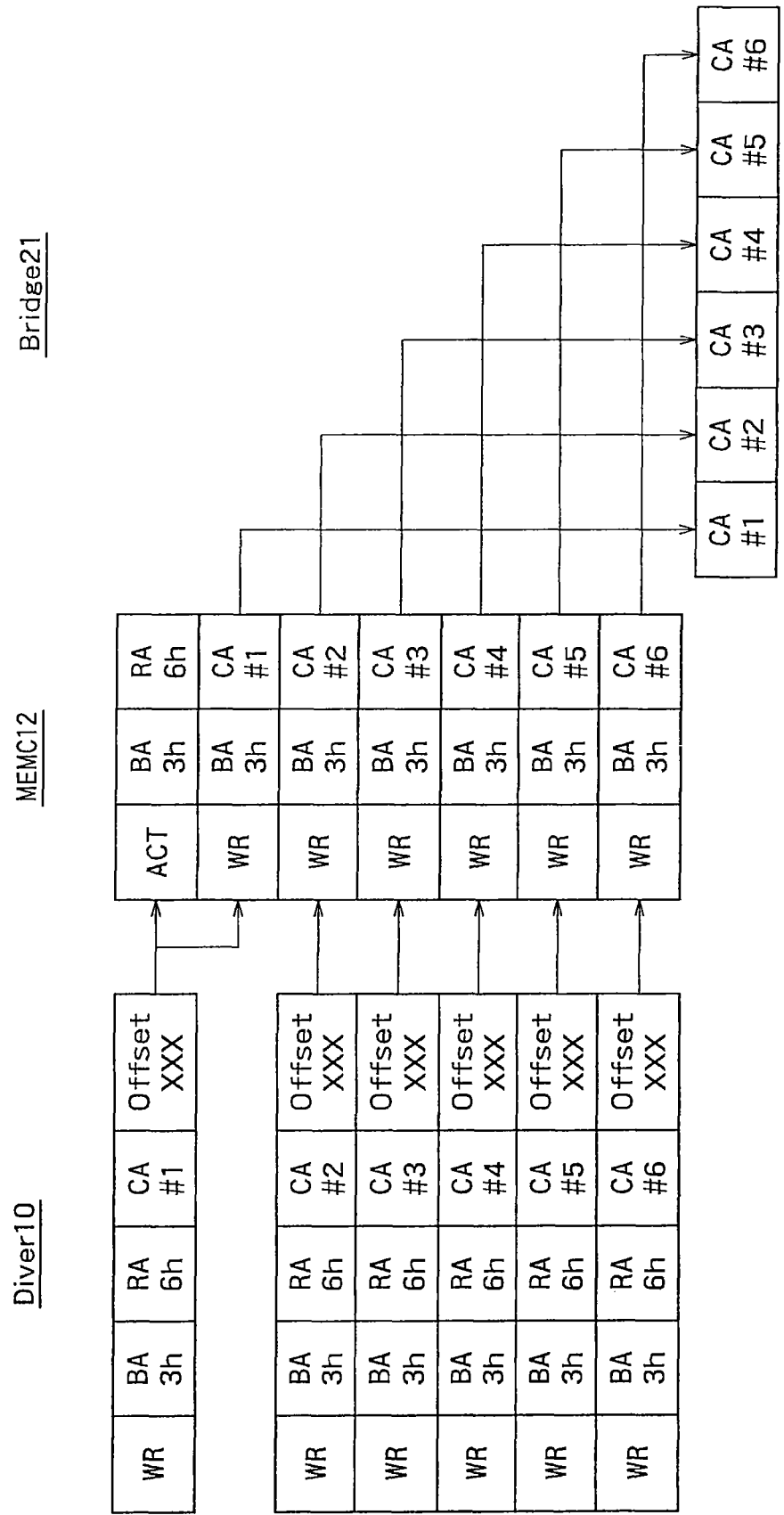

FIGS. 20 and 21 show an example of a configuration of an address and a command from the driver 10 to the bridge chip 21. FIG. 20 shows a configuration of a command and a read address relating to a NAND command (Read Add Q). For example, the driver 10 issues six read commands (RD). First addresses are also issued with such read commands. Each of the first addresses includes a bank address (BA), a row address (RA), and a column address (CA). Column addresses (CA) corresponding to the six read commands include a 64-bit read address as a whole. That is, the column addresses (CA) corresponding to the six read commands include divided pieces of the read address. Bank addresses and row addresses RA corresponding to the six read commands are identical to each other. A bank address is combined with a read command, thereby constituting a NAND command. The row address RA indicates a burst length of read data. Therefore, six bank addresses are identical to each other and six row addresses are also identical to each other in FIG. 20.

After an ACTIVE command, the memory controller 12 transmits bank addresses (BA), row addresses (RA), and column addresses (CA) to the bridge chip 21 along with read commands (RD). The bridge chip 21 combines six column addresses (CA#1 to CA#6) obtained by the six read commands according to a combination of the read command (RD) and the bank address (BA), thereby generating a 64-bit address.

FIG. 21 shows a configuration of a command and a write address relating to a NAND command (Read Add Q). A write address is also generated by combining six column addresses CA (CA#1 to CA#6) transmitted from the driver 10 and the memory controller 12 with each other.

According to the second embodiment, a read address and a write address are divided by using a plurality of column addresses. However, the read address and the write address can be divided by using a plurality of row addresses or a plurality of bank addresses. In this case, two of a bank address, a row address, and a column address are used for indicating a NAND command or a burst length.

(Read Operation)

Figure 22:
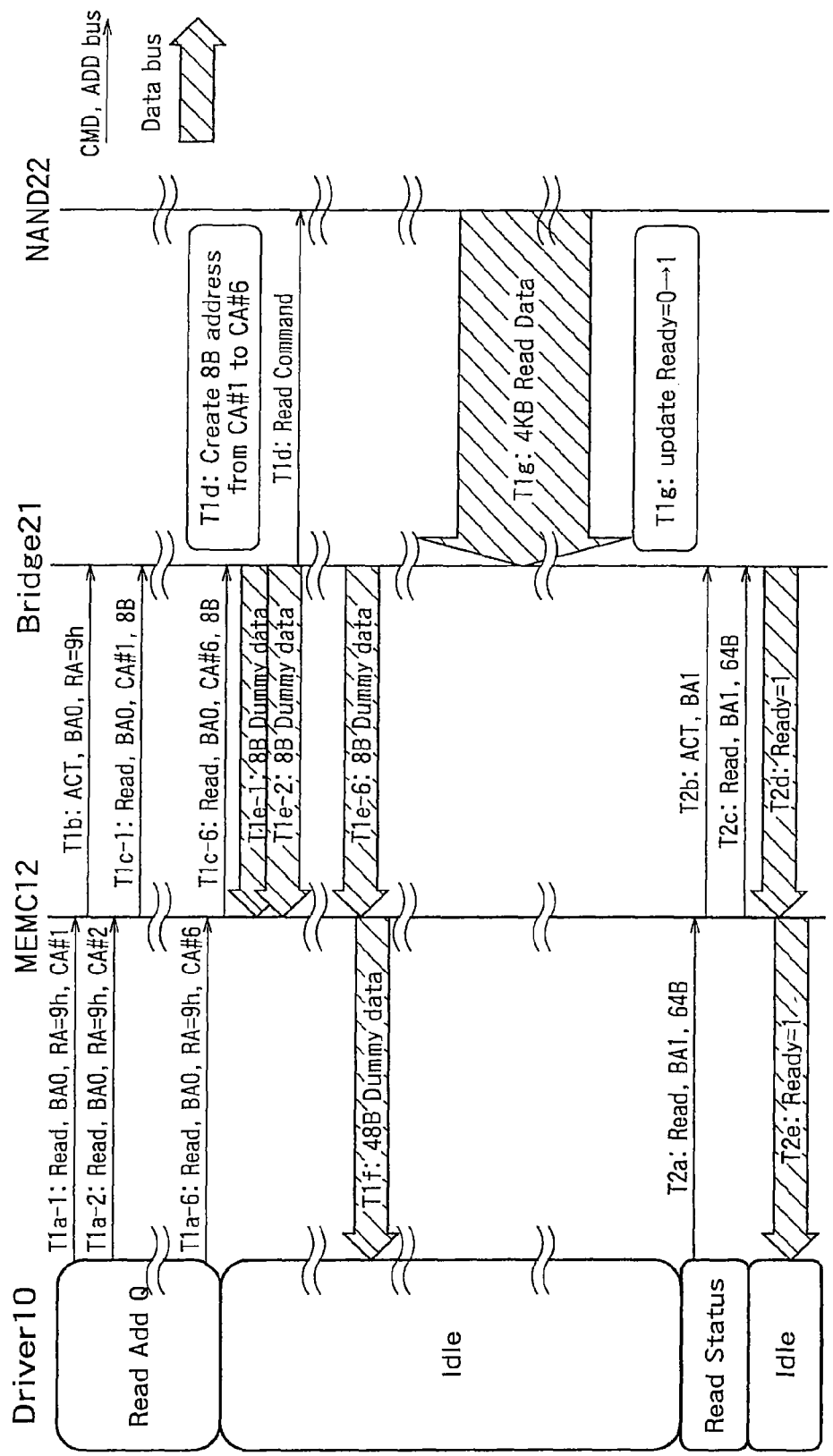
FIGS. 22 and 23 are timing charts of a read operation of the memory system 1 according to the second embodiment.
Figure 23:
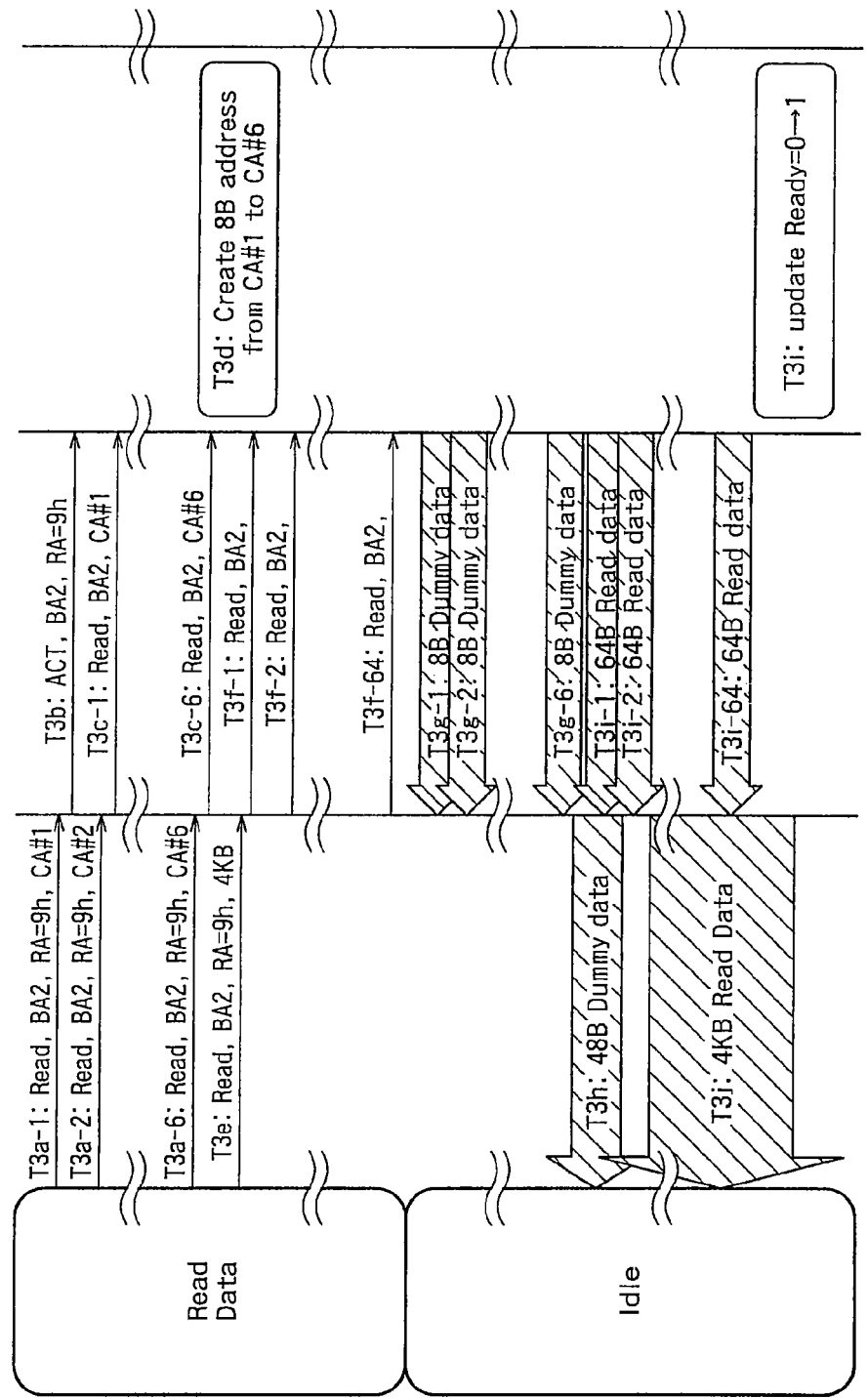

FIGS. 22 and 23 are timing charts of a read operation of the memory system 1 according to the second embodiment.

At time points T1a-1 to T1a-6, the driver 10 issues six successive read commands (Read Add Q) for the bank address BA0. The driver 10 also divides a read address (for example, 64 bits) into pieces and transmits the divided pieces of the read address to the memory controller 12 as six column addresses CA. The driver 10 thus divides the entire read address into six columns addresses and transmits the column addresses. At this time, the driver 10 also transmits a burst length (9h) of data to be read from the NAND memory 22 via a row address RA. In this case, 4 kilobytes (9h=4 kilobytes) is specified as the burst length of read data. After the driver 10 has transmitted six successive read commands, the driver 10 returns to an idle state. The relationship between the row address RA and the burst length is shown in FIG. 16. While the burst length of data transmitted to the memory controller 12 is arbitrary, the burst length is set to, for example, 8 bytes.

Next, at the time point T1b, the memory controller (MEMC) 12 issues an ACTIVE command for the bank address BA0. At this time, the memory controller 12 also transmits the burst length (9h=4 kilobytes) of the read data as the row address RA via an address bus to the bridge chip 21.

At time points T1c-1 to T1c-6, the memory controller 12 issues six successive read commands for the bank address BA0 to the bridge chip 21. The memory controller 12 also divides a read address (for example, 64 bits) into pieces and transmits the divided pieces of the read address to the bridge chip 21 as six column addresses CA. That is, the memory controller 12 divides the entire read address into six pieces and transmits the six pieces via the address bus to the bridge chip 21.

Next, at a time point T1d, the bridge chip 21 recognizes that the read command for the bank address BA0 is a Read Add Q command based on the truth table of FIG. 19, and recognizes CA#1 to CA#6 obtained as the part of column address CA of an entire read address. The bridge chip 21 then combines the addresses (CA#1 to CA#6) with each other, thereby reproducing a 64-bit read address. The bridge chip 21 also recognizes information received as the row address RA for the ACTIVE command as the burst length of data to be read from the NAND memory 22. The bridge chip 21 thus issues a read command to the NAND memory 22 and registers a request (a read request) to read data from a read address in "Q(RD_REQ_Q)". Processes for "RD_REQ_Q" are identical to those of the first embodiment.

At time points T1e-1 to T1e-6, the bridge chip 21 transmits dummy data back to the memory controller 12 in response to the read commands transmitted at T1c-1 to T1c-6. For example, the dummy data can be an arbitrary data pattern of all "0s" or "1s". Alternatively, the bridge chip 21 can transmit status information back to the memory controller 12 instead of the dummy data. In this case, the status information can include information indicating that a preparation for reading read data has not been completed (Ready=0). The memory controller 12 and the driver 10 can thus recognize that read data has not been read from the NAND memory 22 into the bridge chip 21.

At a time point T1f, the memory controller 12 transmits the dummy data or the status information to the driver 10. The driver 10 recognizes the dummy data or the status information, ignores it, and keeps an idle state.

At a time point T1g, the NAND memory 22 transmits 4 kilobytes of read data to the bridge chip 21. The read data is stored in a read buffer in the bridge chip 21. Accordingly, when a preparation for reading read data is completed, the bridge chip 21 deletes the corresponding read request registered in "Q(RD_REQ_Q)" and registers this read request in "Q(RD_CMP_Q)". The status information is then changed to Ready=1.

At the time point T2a, the driver 10 issues a read command (Read Status) for the bank address BA1. Operations for "Read Status" are identical to the operations at T2a to T2e in FIG. 11 in the first embodiment.

At time points T3a-1 to T3a-6 shown in FIG. 23, the driver 10 issues six successive read commands (Read Data) for the bank address BA2. The driver 10 also divides a read address (for example, 64 bits) into six column addresses CA and transmits the six column addresses to the memory controller 12. The driver 10 thus divides the entire read address into six pieces and transmits the six pieces of the read address to the memory controller 12. At this time, the driver 10 also transmits a burst length (9h) of data to be read from the NAND memory 22 via a row address RA to the memory controller 12. In this case, 4 kilobytes (9h=4 kilobytes) is specified as the burst length of read data. The burst length for the memory controller 12 is 8 bytes, for example. After the driver 10 has transmitted six read commands, the driver 10 returns to an idle state.

Next, at the time point T3b, the memory controller 12 issues an ACTIVE command for the bank address BA2. At this time, the memory controller 12 also transmits the burst length (9h=4 kilobytes) of the read data as the row address RA via an address bus to the bridge chip 21.

At time points T3c-1 to T3c-6, the memory controller 12 issues six successive read commands for the bank address BA2 to the bridge chip 21. The memory controller 12 also divides the entire read address (for example, 64 bits) into six pieces and transmits the six pieces of the read address via the address bus to the bridge chip 21.

At the time point T3d, the bridge chip 21 recognizes that the read command for the bank address BA2 is a Read Data command based on the truth table of FIG. 19, and recognizes CA#1 to CA#6 obtained as the column address CA at T3c-1 to T3c-6 as a read address. The bridge chip 21 then combines the addresses (CA#1 to CA#6) with each other, thereby reproducing a 64-bit read address. The bridge chip 21 then prepares for outputting data corresponding to the reproduced read address.

At the time point T3e, after the driver 10 issues six read commands at T3a-1 to T3a-6, the driver 10 transmits a read command to the memory controller 12 for reading read data (for example, 4 kilobytes).

At time points T3f-1 to T3f-64, the memory controller 12 issues a read command for the bank address BA2 to the bridge chip 21. At this time, the bank address BA2 is identical to the bank address BA2 transmitted at T3a. Therefore, the read command is for the data prepared at T3d mentioned above. A read command is issued for the number of times required according to a burst length. For example, assuming that 8×64 bits=64 bytes of data is read by one read command, when 4 kilobytes of data is read, the driver 10 issues a read command for 64 times in total (T3f-1 to T3f-64).

At time points T3g-1 to T3g-6, the bridge chip 21 transmits dummy data back to the memory controller 12 in response to the read commands transmitted at T3c-1 to T3c-6. The dummy data can be identical to the dummy data at T1e-1 to T1e-6.

At a time point T3h, the memory controller 12 transmits the dummy data or the status information (for example, 48 bytes) to the driver 10. The driver 10 recognizes the dummy data or the status information and keeps an idle state.

At time points T3i-1 to T3i-64, in response to the read commands received at T3f-1 to T3f-64, the bridge chip 21 transmits prepared read data to the memory controller 12. When 64 read commands are issued, the bridge chip 21 transmits 64 bytes of read data to the memory controller 12 in 64 times (4 kilobytes in total). When read data has been transmitted, the bridge chip 21 returns Ready in the status information.

At a time point T3*j*, the memory controller 12 transmits 4 kilobytes of read data to the driver 10. The memory controller 12 can divide read data into pieces of an arbitrary length (a burst length) and transmit the divided pieces of the read data to the driver 10.

(Write Operation)

Figure 24:
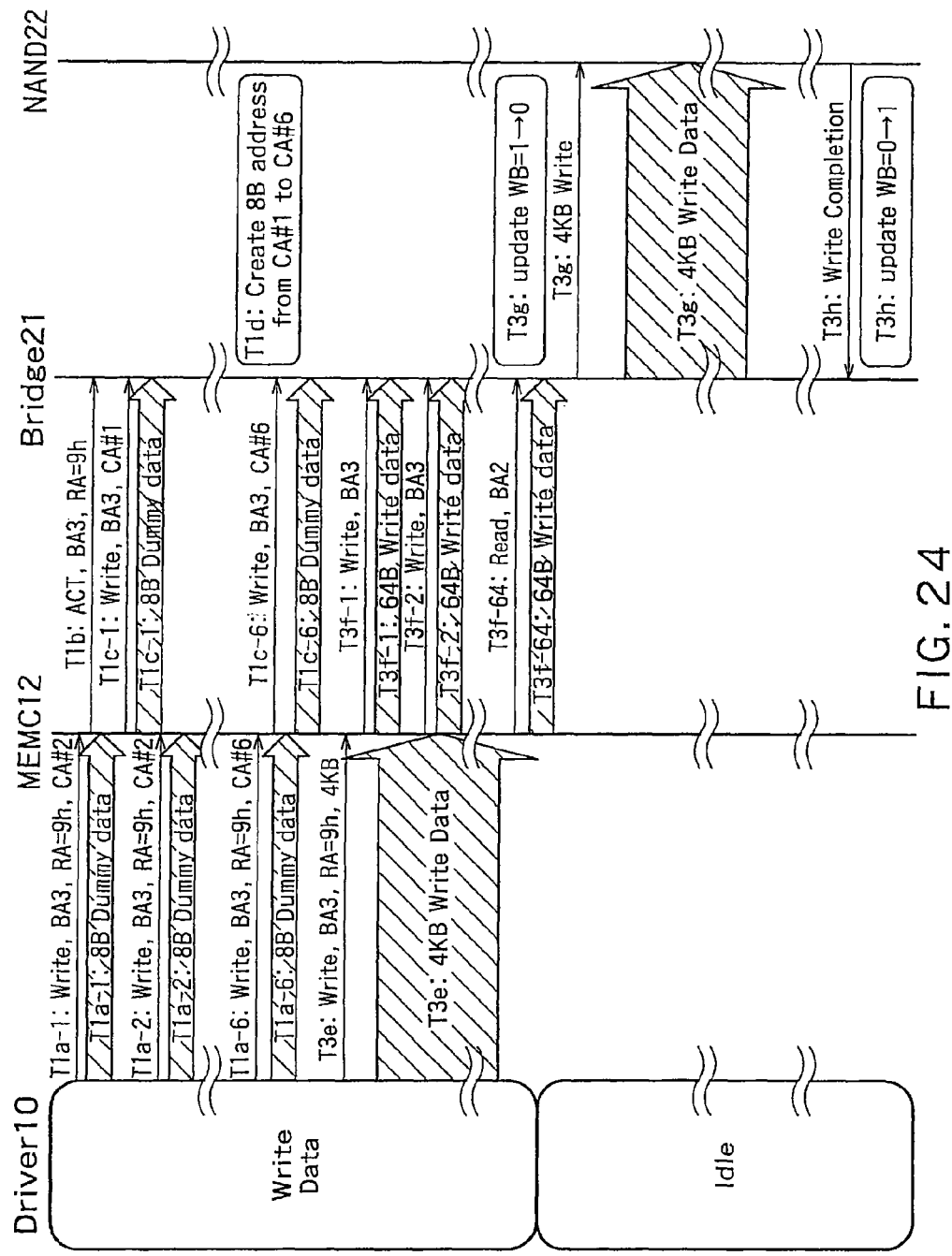
FIG. 24 is a timing chart of a write operation of the memory system 1 according to the second embodiment.

FIG. 24 is a timing chart of a write operation of the memory system 1 according to the second embodiment.

First, at the time points T1*a*-1 to T1*a*-6, the driver 10 issues six successive write commands (Write Data Add) for the bank address BA3. The driver 10 also divides a write address (for example, 64 bits) into pieces and transmits the divided pieces of the write address to the memory controller 12 as six column addresses CA. The driver 10 thus divides the entire write address into six columns addresses and transmits the column addresses. At this time, the driver 10 also transmits a burst length (9h) of data to be written in the NAND memory 22 via a row address RA to the memory controller 12. While a burst length for the memory controller 12 is arbitrary, the burst length is set to, for example, 8 bytes. At this time, data transmitted from the driver 10 to the memory controller 12 is dummy data. After the driver 10 has transmitted six write commands, the driver 10 returns to an idle state.

At the time point T1*b*, the memory controller 12 issues an ACTIVE command for the bank address BA3 to the bridge chip 21. At this time, the memory controller 12 also transmits the burst length (9h=4 kilobytes) of the write data as the row address RA via an address bus to the bridge chip 21. This burst length is for the NAND memory 22.

At the time points T1*c*-1 to T1*c*-6, the memory controller 12 issues six successive write commands for the bank address BA3 to the bridge chip 21. The memory controller 12 also divides a write address (for example, 64 bits) into pieces and transmits the divided pieces of the write address to the bridge chip 21 as six column addresses CA. That is, the memory controller 12 divides the entire write address into six pieces and transmits the six pieces via an address bus to the bridge chip 21. At this time, data transmitted from the memory controller 12 to the bridge chip 21 is dummy data. The bridge chip 21 ignores the dummy data.

At the time point T1*d*, the bridge chip 21 recognizes that the write command for the bank address BA3 is a Write Data command based on the truth table of FIG. 19, and recognizes CA#1 to CA#6 obtained as the part of column address CA of an entire write address. The bridge chip 21 then combines the addresses (CA#1 to CA#6) with each other, thereby reproducing an 8-bit write address. The bridge chip 21 recognizes information received as the row address RA for the ACTIVE command as the burst length of data to be read from the NAND memory 22.

At the time point T3*e*, after the driver 10 issues six write commands at T1*a*-1 to T1*a*-6, the driver 10 transmits write data (for example, 4 kilobytes) to the memory controller 12.

At the time point T3*f*-1 to T3*f*-64, the memory controller 12 issues a write command for the bank address BA3 to the bridge chip 21. In this case, the write address, the bank address BA3, and the row address RA are identical to those transmitted at T1*a*-1 to T1*a*-6. Therefore, the write command is for an area (a page) of a write buffer in the bridge chip 21 prepared at T1*a* mentioned above. The write command is issued for the number of times required according to a burst length. For example, assuming that 8×64 bits=64 bytes of data is written by one write command, to write 4 kilobytes of data, the memory controller 12 issues a write command for 64 times in total (T3*f*-1 to T3*f*-64). When write data has been written in the write buffer in the bridge chip 21, the bridge chip 21 sets a value of a WB register in status information to 0. WB register=0 means that there is no space in the write buffer. For convenience, according to the memory system 1 of the second embodiment, the value of the WB register is changed assuming that the write buffer runs out of space in one write operation. However, the memory system 1 can perform a plurality of write requests successively until no space is left in the write buffer.

At a time point T3*g*, the bridge chip 21 issues a write command to the NAND memory 22 by using the write address (8 bytes) generated at T1*d* and the write data (4 kilobytes) received at T3*f*.

The bridge chip 21 then writes the write data stored in the write buffer in the NAND memory 22 according to the write address received at T1*a*.

At a time point T3*h*, when the bridge chip 21 receives a write completion notification from the NAND memory 22, the bridge chip 21 returns the WB register to 1. When the status information includes information about a free space in the write buffer in the bridge chip 21, the bridge chip 21 can add the capacity of data that has been written in the NAND memory 22 to the space in the write buffer. Specifications of "Q(WR_REQ_Q)" and "Q(WR_COMP_Q)" can be identical to those of the first embodiment.

As explained above, according to the second embodiment, the memory controller 12 (the driver 10) divides a single read address or write address into pieces by using a plurality of column addresses and transmits the divided pieces via an address bus to the bridge chip 21. The bridge chip 21 can generate a single read address or write address using the column addresses and access the NAND memory 22 by using the read address or write address. In this manner, similarly to the first embodiment, when the NAND memory 22 is controlled by using a DRAM protocol, accessible address space can be expanded also in the second embodiment.

Further, the second embodiment can also achieve other effects of the first embodiment.

The memory system 1 according to the second embodiment includes the bridge chip 21 between the memory controller 21 and the NAND memory 22. However, the bridge chip 21 can be used between a memory controller and a memory that are of arbitrary and different types. Even in a case of such a memory system, effects of the second embodiment are not lost.

(Third Embodiment)

The page size of an MRAM is smaller than that of a DRAM. Therefore, conventional DRAM controllers cannot control the MRAM. For example, FIG. 25 is a table representing a relationship of the number of addresses and between an MRAM and a DRAM according to a third embodiment. As shown in FIG. 25, when the number of column addresses provided in the DRAM is A[0] to A[m+1], the number of column addresses in the MRAM is A[0] to A[m]. The number of column addresses in the MRAM is less than that in the DRAM by one. Therefore, when a DRAM controller accesses a column address A[m+1], the MRAM cannot operate.

A memory system 2 according to the third embodiment uses a redundant column address A[m+1] in a DRAM controller to select an MRAM chip.

FIG. 26 is a block diagram of an example of a configuration of the memory system 2 according to the third embodiment. The memory system 2 includes the memory controller 12 and MRAM chips 31 and 32. One memory controller 12 is connected to the two MRAM chips 31 and 32 in a corresponding manner. Configurations of the memory controller 12 according to the third embodiment can be identical to those shown in FIG. 1.

An address bus, a data bus, and the like in the memory controller 12 are connected commonly to the two MRAM chips 31 and 32. Accordingly, clocks CK and /CK, a clock enable CKE, a chip select signal /CS, a row address signal /RAS, a column address signal /CAS, a write enable signal /WE, a bank address BA, column addresses A[0] to A[m], row addresses A[0] to A[n], and data buses DM, DQ, DQS, and /DQS are common to the two MRAM chips 31 and 32. n and m are an integer.

According to the third embodiment, the redundant column address A[m+1] from the memory controller 12 is used not as a column address but to select one of the MRAM chips 31 and 32.

FIG. 27 is a block diagram of an example of a configuration of an activation-signal control unit 40 that performs a logical operation of the chip select signal /CS, the column address A[m+1], and the signals /RAS and /CAS. The activation-signal control unit 40 is a logic circuit provided in each of the MRAM chips 31 and 32. The activation-signal control unit 40 having the chip select signal /CS, the column address A[m+1], the signal /RAS, and the signal /CAS input thereto outputs a logical operation result as a chip select signal /CSi_1 or /CSi_2. The chip select signal /CSi_1 is generated in the MRAM chip 31 and the chip select signal /CSi_2 is generated in the MRAM chip 32.

FIG. 28 is a truth table representing a logical operation of the activation-signal control unit 40. The MRAM chips 31 and 32 are selected (activated) when internal activation signals /CSi_1 and /CSi_2 are logical low (L) and unselected (inactivated) when the internal activation signals /CSi_1 and /CSi_2 are logical high (H).

The chip select signal /CS functions as a chip enable signal common to the MRAM chips 31 and 32. Therefore, when the chip select signal /CS is logical high (H), the MRAM chips 31 and 32 are unselected regardless of the logic of the signals /RAS and /CAS and the column address A[m+1]. On the other hand, when the chip select signal /CS is logical low (L), the MRAM chips 31 and 32 can be selected (activated) according to the logic of the signals /RAS and /CAS and the column address A[m+1].

The signals /RAS and /CAS vary according to an operation mode such as a read and write operation, a pre-charge operation, and a refresh operation. For example, in the read and write operation, the signals /RAS and /CAS are logical high (H) and logical low (L), respectively. In a mode register or the refresh operation, the signals /RAS and /CAS are L. In active or the pre-charge operation, the signals /RAS and /CAS are L and H, respectively. In a standby state or an inactive state, the signals /RAS and /CAS are H.

With reference to the truth table of FIG. 28, when the chip select signal /CS is H, the MRAM chips 31 and 32 are not selected (activated). Even when the chip select signal /CS is L, in a case where the signals /RAS and /CAS are H, the MRAM chips 31 and 32 are not selected (activated).

When the chip select signal /CS is L and the signals /RAS and /CAS are L (in a case of the mode register or the refresh operation), both of the MRAM chips 31 and 32 are selected (activated).

When the chip select signal /CS is L, the signal /RAS is L, and the signal /CAS is H (in a case of active or pre-charge), both of the MRAM chips 31 and 32 are selected (activated).

When the chip select signal /CS is L, the signal /RAS is H, and the signal /CAS is L (in a case of read or write), one of the MRAM chips 31 and 32 is selected according to A[m+1]. For example, when A[m+1] is L, the MRAM chip 31 is selected and the MRAM chip 32 is unselected. When A[m+1] is H, the MRAM chip 32 is selected and the MRAM chip 31 is unselected. Therefore, in the read or write operation, the memory controller 12 can read data selectively from one of the MRAM chips 31 and 32 or can write data selectively in one of them. The column addresses A[0] to A[m] other than the column address A[m+1] can be used as column addresses in normal cases.

The activation-signal control unit 40 needs to be logically configured by using a ROM, a fuse, a bonding option, and the like so that one of the MRAM chips 31 and 32 is selected according to the column address A[m+1].

As explained above, the memory system 2 according to the third embodiment can control two MRAM chips 31 and 32 selectively by using a redundant column address A[m+1] of the memory controller 12. That is, while the number of column addresses in the DRAM memory controller 12 is larger than that in an MRAM chip, the number of column addresses in the MRAM chip is increased twice by using the redundant column address A[m+1]. In this manner, according to the third embodiment, the capacity of a memory area in an MRAM can be increased substantially twice while using the DRAM memory controller 12.

Figure 29:
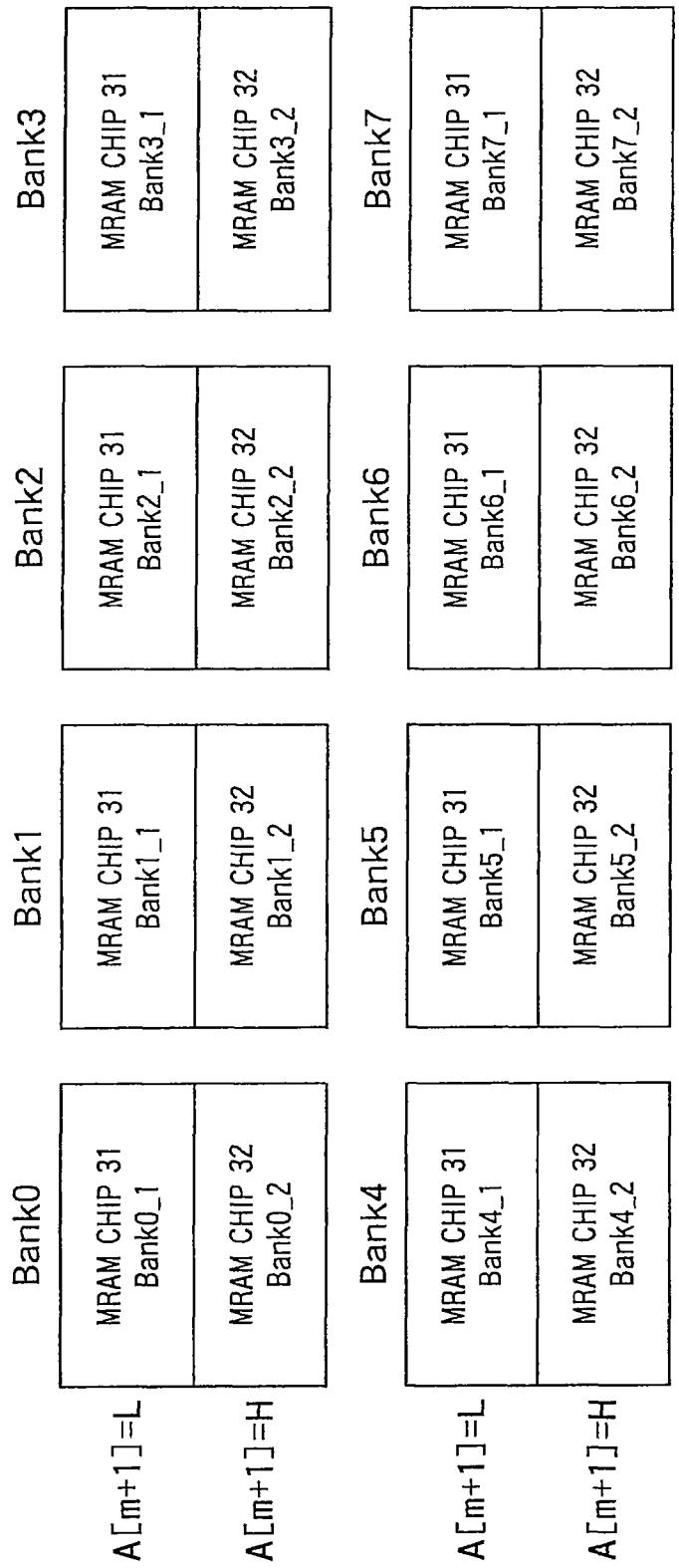
FIG. 29 shows an example of a configuration of a memory bank using the MRAM chips 31 and 32 in the memory system 2.

FIG. 29 shows an example of a configuration of a memory bank using the MRAM chips 31 and 32 in the memory system 2. In the third embodiment, memory banks Bank0 to Bank7 in the memory system 2 are constituted by memory banks Bank0_1 to Bank7_1 of the MRAM chip 31 and Bank0_2 to Bank7_2 of the MRAM chip 32. For example, a memory bank Bank0 in the memory system 2 is constituted by the Bank0_1 of the MRAM chip 31 and the Bank0_2 of the MRAM chip 32. Similarly, a memory bank Banki in the memory system 2 is constituted by a combination of a Banki_1 of the MRAM chip 31 and a Banki_2 of the MRAM chip 32.

The memory controller 12 can select any of Bank0 to Bank7 by a bank address and a memory bank of one of the MRAM chips 31 and 32 by the column address A[m+1].

(Fourth Embodiment)

Figures 30, 31:
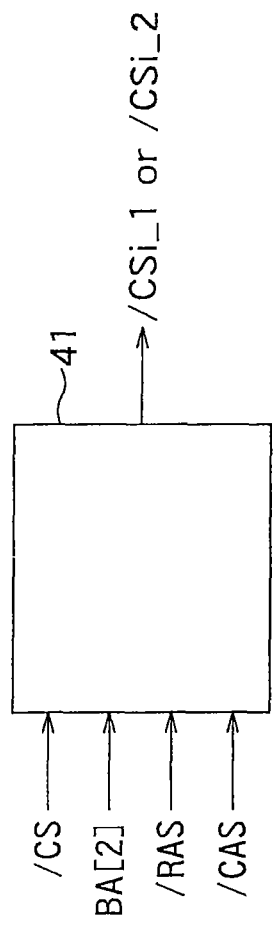
FIG. 30 is a block diagram of an example of a configuration of an activation-signal control unit 41 that performs a logical operation of a bank address BA, a chip select signal /CS, and signals /RAS and /CAS according to a fourth embodiment.
FIG. 31 is a truth table representing a logical operation of the activation-signal control unit 41.

FIG. 30 is a block diagram of an example of a configuration of an activation-signal control unit 41 that performs a logical operation of a bank address BA, a chip select signal /CS, and signals /RAS and /CAS according to a fourth embodiment. The activation-signal control unit 41 is a logic circuit provided in each of the MRAM chips 31 and 32. The activation-signal control unit 41 having the chip select signal /CS, a bank address BA[2], the signal /RAS, and the signal /CAS input thereto outputs a logical operation result as a chip select signal /CSi_1 or /CSi_2. The chip select signal /CSi_1 is generated in the MRAM chip 31 and the chip select signal /CSi_2 is generated in the MRAM chip 32.

FIG. 31 is a truth table representing a logical operation of the activation-signal control unit 41. The MRAM chips 31 and 32 are selected (activated) when the chip select signals /CSi_1 and /CSi_2 are logical low (L) and unselected (inactivated) when the chip select signals /CSi_1 and /CSi_2 are logical high (H).

The chip select signal /CS functions as a chip enable signal common to the MRAM chips 31 and 32. Therefore, when the chip select signal /CS is logical high (H), the MRAM chips 31 and 32 are unselected regardless of the logic of the signals /RAS and /CAS and the bank address BA[2]. On the other hand, when the chip select signal /CS is logical low (L), the MRAM chips 31 and 32 can be selected (activated) according to the logic of the signals /RAS and /CAS and the bank address BA[2].

The signals /RAS and /CAS are identical to those explained with reference to FIG. 28.

With reference to the truth table of FIG. 31, when the chip select signal /CS is H, the MRAM chips 31 and 32 are not selected (activated). Even when the chip select signal /CS is L, in a case where the signals /RAS and /CAS are H, the MRAM chips 31 and 32 are not selected (activated).

When the chip select signal /CS is L and the signals /RAS and /CAS are L (in a case of a mode register or a refresh operation), both of the MRAM chips 31 and 32 are selected (activated).

When the chip select signal /CS is L, the signal /RAS is L, and the signal /CAS is H (in a case of active or pre-charge), one of the MRAM chips 31 and 32 is selected according to the bank address BA[2]. For example, when the bank address BA[2] is L, the MRAM chip 31 is selected and the MRAM chip 32 is unselected. When the bank address BA[2] is H, the MRAM chip 32 is selected and the MRAM chip 31 is unselected. Therefore, in the active or pre-charge operation, the memory controller 12 can activate or pre-charge one of the MRAM chips 31 and 32. Although not shown, when all banks are pre-charged, both of the MRAM chips 31 and 32 are selected (activated).

When the chip select signal /CS is L, the signal /RAS is H, and the signal /CAS is L (in a case of read or write), one of the MRAM chips 31 and 32 is selected according to the bank address BA[2]. For example, when the bank address BA[2] is L, the MRAM chip 31 is selected and the MRAM chip 32 is unselected. When the bank address BA[2] is H, the MRAM chip 32 is selected and the MRAM chip 31 is unselected. Therefore, in the read or write operation, the memory controller 12 can read data selectively from one of the MRAM chips 31 and 32 or can write data selectively in one of them. The activation-signal control unit 41 needs to be logically configured by using a ROM, a fuse, a bonding option, and the like so that one of the MRAM chips 31 and 32 becomes selectable according to the bank address BA[2].

Figure 32:
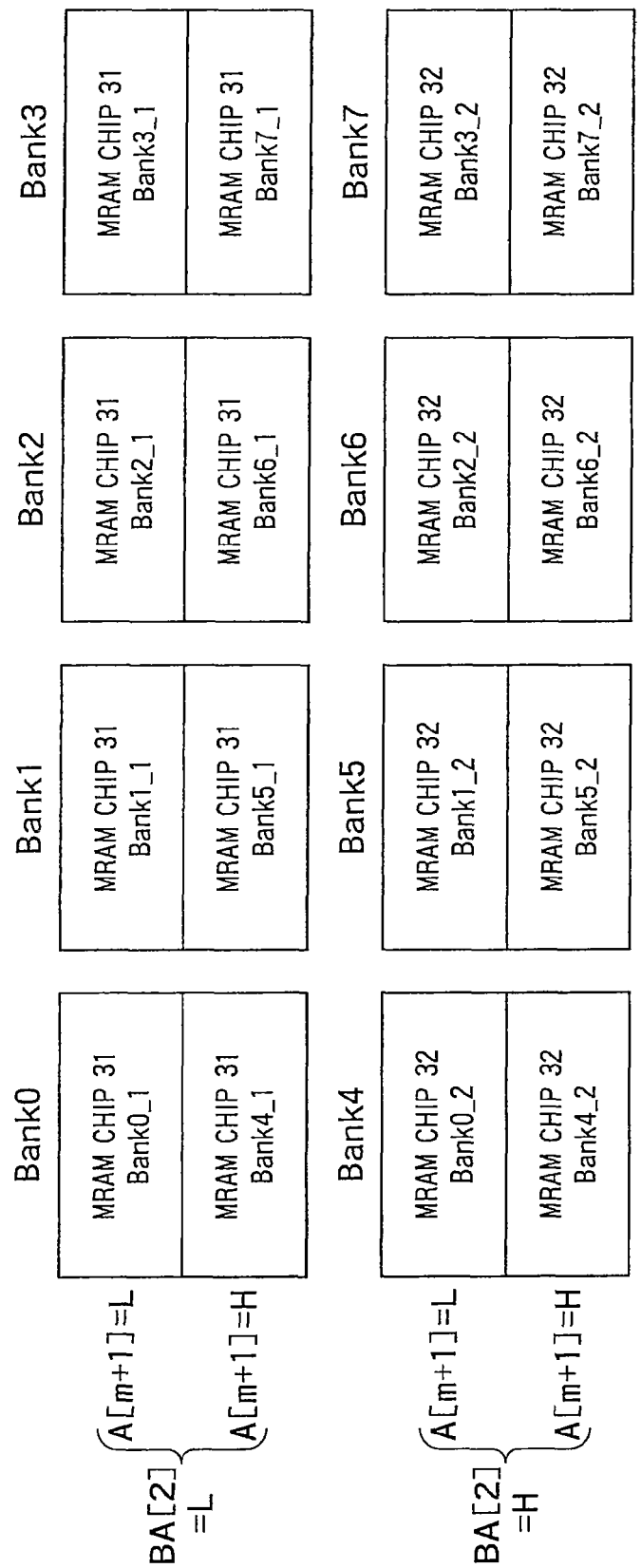
FIG. 32 shows a configuration of a memory bank in the memory system 2 according to the fourth embodiment.

FIG. 32 shows a configuration of a memory bank in the memory system 2 according to the fourth embodiment. In the third embodiment, each memory bank in the memory system 2 is constituted by a combination of memory banks of the two MRAM chips 31 and 32. On the other hand, according to the fourth embodiment, each memory bank in the memory system 2 is constituted by two memory banks of one of the MRAM chips 31 and 32. For example, a memory bank Bank0 in the memory system 2 is constituted by memory banks Bank0_1 and Bank4_1 of the MRAM chip 31. A memory bank Bank1 in the memory system 2 is constituted by memory banks Bank1_1 and Bank5_1 of the MRAM chip 31. In this manner, memory banks Bank0 to Bank3 in the memory system 2 are constituted by memory banks Bank0_1 to Bank7_1 of the MRAM chip 31. Memory banks Bank4 to Bank7 in the memory system 2 are constituted by memory banks Bank0_2 to Bank7_2 of the MRAM chip 32.

A redundant column address A[m+1] is used a type of a bank address to select a memory bank in the MRAM chips 31 and 32. For example, when the column address A[m+1] is L, memory Banks Bank0_1 to Bank3_1 of the MRAM chip 31 and memory Banks Bank0_2 to Bank3_2 of the MRAM chip 32 can be selected. When the column address A[m+1] is H, memory Banks Bank4_1 to Bank7_1 of the MRAM chip 31 and memory Banks Bank4_2 to Bank7_2 of the MRAM chip 32 can be selected.

Therefore, according to the fourth embodiment, the memory banks Bank0 to Bank7 constituted by the two MRAM chips 31 and 32 can be selected by using combinations of the bank address BA[2] and the column address A[m+1]. As a result, the number of column addresses in an MRAM chip can be increased twice also in the fourth embodiment.

(Fifth Embodiment)

Figure 33:
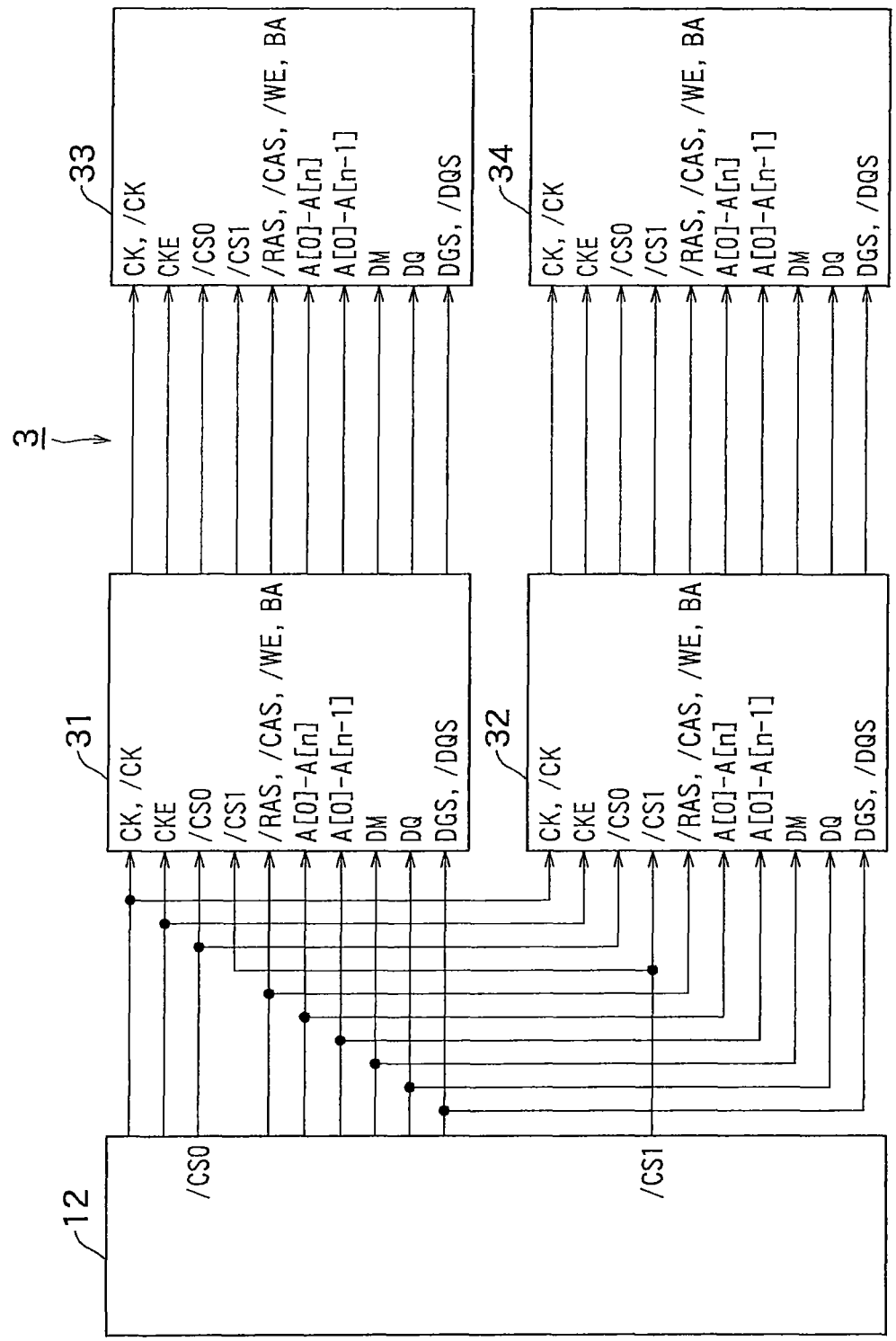
FIG. 33 is a block diagram of an example of a configuration of a memory system 3 according to a fifth embodiment.

FIG. 33 is a block diagram of an example of a configuration of a memory system 3 according to a fifth embodiment. The memory controller 12 according to the fifth embodiment can output two chip select signals. That is, the memory controller 12 can control two DRAM chips. In the fifth embodiment, the memory controller 12 controls four MRAM chips 31 to 34.

An address bus, a data bus, and the like in the memory controller 12 are connected commonly to the four MRAM chips 31 to 34. Accordingly, clocks CK and /CK, a clock enable CKE, chip select signals /CS0 and /CS1, a row address signal /RAS, a column address signal /CAS, a write enable signal /WE, a bank address BA, column addresses A[0] to A[m], row addresses A[0] to A[n], and data buses DM, DQ, DQS, and /DQS are common to the four MRAM chips 31 to 34.

FIG. 34 is a table representing a relationship of the number of addresses between an MRAM and a DRAM according to the fifth embodiment. In the fifth embodiment, as shown in FIG. 34, the number of row addresses in each of the four MRAM chips 31 to 34 is larger than that in a DRAM by one and the number of column addresses in each of the four MRAM chips 31 to 34 is less than that in a DRAM by two. That is, when the number of row addresses in a DRAM chip is A[0] to A[n−1], the number of row addresses in an MRAM chip is A[0] to A[n]. When the number of column addresses in a DRAM chip is A[0] to A[m+2], the number of column addresses in an MRAM chip is A[0] to A[m].

According to the fifth embodiment, column addresses A[m+1] and A[m+2] of the memory controller 12 is used to select the MRAM chips 31 to 34 at the time of read or write. An operation of selecting the MRAM chips 31 to 34 is explained later with reference to FIG. 36.

FIG. 35 is a truth table representing a logical operation of a chip select signal in an active command. An activation-signal control unit (not shown) generates internal activation signals /CSi_1 to /CSi_4 and a row address A[n] from chip select signals /CS0 and /CS1.

The MRAM chips 31 to 34 are selected (activated) when the internal activation signals /CSi_1 to /CSi_4 are logical low (L) and unselected (inactivated) when the internal activation signals /CSi_1 to /CSi_4 are logical high (H).

It is prohibited to cause both of the chip select signals /CS0 and /CS1 to be L. When both of the chip select signals /CS0 and /CS1 are H, the internal activation signals /CSi_1 to /CSi_4 are H. At this time, in an active command, all the MRAM chips 31 to 34 are unselected.

When one of the chip select signals /CS0 and /CS1 is H and the other is L, the internal activation signals /CSi_1 to /CSi_4 are L. At this time, in an active command, all the MRAM chips 31 to 34 become selectable. When the chip select signal /CS0 is H and /CS0 is L, the row address A[n] is L. When the chip select signal /CS0 is L and /CS0 is H, the row address A[n] is H. As explained above, the number of row addresses in an MRAM chip is larger than that in the DRAM memory controller 12 by one. In the fifth embodiment, the memory controller 12 can control a redundant row address A[n] on a side of an MRAM chip by the logic of the chip select signals /CS0 and /CS1.

FIG. 36 is a truth table representing a logical operation of a chip select signal at the time of read or write. In the fifth embodiment, the column addresses A[m+1] and A[m+2] of the memory controller 12 are used to select the MRAM chips 31 to 34 at the time of read or write. It is prohibited to cause both of the chip select signals /CS0 and /CS1 to be L. When both of the chip select signals /CS0 and /CS1 are H, all the MRAM chips 31 to 34 are unselected. Therefore, explanations of a chip selecting operation when both of the chip select signals /CS0 and /CS1 are L or H will be omitted.

When one of the chip select signals /CS0 and /CS1 is H and the other is L, the MRAM chips 31 to 34 become selectable.

When the MRAM chips 31 to 34 become selectable (ACTIVE), any of the MRAM chips 31 to 34 is selected according to the logic of the column addresses A[m+1] and A[m+2]. Read or write can thus be performed on a selected MRAM chip.

The memory system 3 according to the fifth embodiment can control four MRAM chips 31 to 34 selectively by using redundant column addresses A[m+1] and A[m+2] of the memory controller 12. That is, while the number of column addresses in the DRAM memory controller 12 is larger than that in an MRAM chip, the number of column addresses in the MRAM chip is increased four times by using the redundant column addresses A[m+1] and A[m+2]. In this manner, according to the fifth embodiment, the capacity of a memory area in an MRAM can be increased substantially four times while using the DRAM memory controller 12.

The above embodiments can also be applied to a case where the number of column addresses in an MRAM chip is less than that in the DRAM memory controller 12 by three or more. In such a case, for example, when the number of column addresses in an MRAM chip is less than that in the DRAM memory controller 12 by k (k is an integer), $k^2$ memory chips can be connected to the memory controller 12. In this case, the memory controller 12 can select any of the $k^2$ memory chips by using k redundant column addresses.

Furthermore, in the above embodiments, instead of a column address, other addresses (a row address and a bank address) can be used for selecting a chip. Further, while the above embodiments use a DRAM memory controller to control an MRAM chip, the above embodiments can be applied to combinations of a memory controller and a memory chip that are of arbitrary and different types.

A memory cell array formation may be disclosed in U.S. patent application Ser. No. 12/407,403 filed on Mar. 19, 2009. U.S. patent application Ser. No. 12/407,403, the entire contents of which are incorporated by reference herein.

Furthermore, a memory cell array formation may be disclosed in U.S. patent application Ser. No. 12/406,524 filed on Mar. 18, 2009. U.S. patent application Ser. No. 12/406,524, the entire contents of which are incorporated by reference herein.

Furthermore, a memory cell array formation may be disclosed in U.S. patent application Ser. No. 12/679,991 filed on Mar. 25, 2010. U.S. patent application Ser. No. 12/679,991, the entire contents of which are incorporated by reference herein.

Furthermore, a memory cell array formation may be disclosed in U.S. patent application Ser. No. 12/532,030 filed on Mar. 23, 2009. U.S. patent application Ser. No. 12/532,030, the entire contents of which are incorporated by reference herein.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A memory system comprising:
a memory controller including a first data bus and a first address bus used for a first protocol;
a memory part including a second data bus and a second address bus used for a second protocol different from the first protocol; and
a bridge part capable of receiving an address from the memory controller via the first data bus and outputting the address via the second address bus to the memory part,
wherein
the bridge part receives write data from the memory controller via the first data bus and receives a write address of the write data from the memory controller via the first address bus,
the bridge part recognizes that the write data is a certain address of the memory part, based on the write address of the write data, and
the bridge part transmits the address of the memory part via the second address bus to the memory part.

2. The system of claim 1, wherein the bridge part receives a burst length of read data from the memory controller via the first address bus.

3. The system of claim 1, wherein the bridge part comprises a buffer being capable of holding data therein, and transmits status information indicating a state of the buffer to the memory controller.

4. The system of claim 3, wherein the status information includes information indicating whether read data is stored in the buffer, information about usage of the buffer, or information about a free space in the buffer.

5. The system of claim 3, wherein the status information includes information indicating a time period from when read data is transmitted from the memory part to when the read data is stored in the buffer from the memory part or information about the number of data write processes and the number of data erasure processes before a read operation starts.

6. The system of claim 1, wherein the bridge part is capable of holding a plurality of access requests, and performs a process based on priorities included in the access requests.

7. The system of claim 1, wherein the bridge part receives an address of an access destination and a first command from the memory controller, generates a second command based on a combination of the address and the first command, and transmits the second command to the memory chip.

8. The system of claim 1, wherein
the memory controller is a DRAM controller, and
the memory part is a NAND flash memory.

9. A memory system comprising:
a memory controller including a first data bus and a first address bus used for a first protocol;
a memory part including a second data bus and a second address bus used for a second protocol different from the first protocol; and
a bridge part capable of generating a single second address by using a plurality of first addresses transmitted from the memory controller via the first address bus, and outputting the second address via the second address bus to the memory part, wherein each of the first addresses includes a bank address, a row address, and a column address, the memory controller transmits one of the bank address, the row address, and the column address to the bridge part, the bridge part generates the second address by using the addresses transmitted from the memory controller, and the other two addresses of the bank address, the row address, and the column address are respectively identical to each other in the first addresses.

10. The system of claim 9, wherein the memory controller divides the second address in each of the first addresses, and transmits divided pieces of the second address to the bridge part.

11. The system of claim 9, wherein the bridge part receives a burst length of read data from the memory controller via the first address bus.

12. The system of claim 9, wherein the bridge part comprises a buffer being capable of holding data therein, and transmits status information indicating a state of the buffer to the memory controller.

13. A memory system comprising:

a memory controller capable of specifying a first number of addresses, respectively; and a plurality of memory chips respectively including memory banks having a second number of addresses, the second number of addresses being smaller than the first number of addresses, wherein the memory controller selects any one of the memory chips by using a redundant address, which is not used by the controller to select the memory banks, with respect to addresses of the memory chip among addresses of the memory controller.

14. The system of claim 13, wherein the first number of addresses is the number of column addresses, the number of row addresses, or the number of bank addresses in the memory controller, the second number of addresses is the number of column addresses, the number of row addresses, or the number of bank addresses in the memory chip, and the redundant address is any one of a column address, a row address, or a bank address.

15. The system of claim 13, wherein when a difference between the first number of addresses and the second number of addresses is k (k is an integer), the memory controller selects a memory chip among k2 memory chips by using k addresses of the redundant addresses.

16. The system of claim 13, wherein the first number of addresses is the number of column addresses in the memory controller, the second number of addresses is the number of the column addresses in the memory chip, and the number of row addresses in the memory controller is smaller than the number of row addresses in the memory chip, and the memory controller selects a memory chip among the memory chips by using the redundant address, and generates a row address that is insufficient by using a chip selector signal for selecting the memory chip.

* * * * *